United States Patent
Shinbori et al.

(10) Patent No.: US 8,979,124 B2
(45) Date of Patent: Mar. 17, 2015

(54) VEHICLE AND SHOULDER BOLSTER MEMBER

(71) Applicant: Yamaha Hatsudoki Kabushiki Kaisha, Iwata-shi, Shizuoka (JP)

(72) Inventors: Masahide Shinbori, Shizuoka (JP); Masayuki Kubo, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,739

(22) Filed: Feb. 12, 2014

(65) Prior Publication Data

US 2014/0225356 A1 Aug. 14, 2014

Related U.S. Application Data

(60) Provisional application No. 61/764,684, filed on Feb. 14, 2013.

(51) Int. Cl.
| | |
|---|---|
| *B60R 21/13* | (2006.01) |
| *B60R 21/055* | (2006.01) |
| *B62D 63/04* | (2006.01) |
| *B62D 23/00* | (2006.01) |

(52) U.S. Cl.
CPC .............. *B62D 63/04* (2013.01); *B60R 21/055* (2013.01); *B62D 23/005* (2013.01)
USPC ........................................................ 280/756

(58) Field of Classification Search
USPC ............. 280/756, 801.1, 730.2; 297/232, 248
See application file for complete search history.

(56) References Cited

U.S. PATENT DOCUMENTS

| | | | |
|---|---|---|---|
| 2002/0130496 A1* | 9/2002 | Itabashi et al. | 280/730.2 |
| 2009/0184531 A1 | 7/2009 | Yamamura et al. | |
| 2012/0085588 A1 | 4/2012 | Kinsman et al. | |
| 2012/0217078 A1 | 8/2012 | Kinsman et al. | |

* cited by examiner

*Primary Examiner* — Faye M. Fleming
(74) *Attorney, Agent, or Firm* — Keating & Bennett, LLP

(57) ABSTRACT

A vehicle includes a pair of front wheels, a pair of rear wheels, a frame portion, a seat unit including a first seat portion and a second seat portion arranged side by side in a width direction of the vehicle and supported by the frame portion, a steering wheel in front of the first seat portion, a roll-over protection cage supported by the frame portion to cover an area above the seat unit and the steering wheel, and a shoulder bolster portion. The first seat portion includes a seat bottom portion that supports a human body from below, and a back support portion that supports the human body from behind. In the width direction of the vehicle, at least a portion of the shoulder bolster portion is on an outer side of the seat unit. In a side view, at least a portion of the shoulder bolster portion is at a more rearward position than a forward end of the seat bottom portion, at a more forward position than the back support portion, at a higher position than a center of the steering wheel in an up-down direction, and at a lower position than an upper end of the steering wheel. The shoulder bolster portion has its upper end at a higher position than a midway point between a center of an upper surface of the seat bottom portion and an upper end of the back support portion in an up-down direction.

22 Claims, 25 Drawing Sheets

10

VEHICLE AND SHOULDER BOLSTER MEMBER

BACKGROUND OF THE INVENTION

1. Field of the Invention

The present invention relates to vehicles and shoulder bolster members, and more specifically to a vehicle including a shoulder bolster portion, and to a shoulder bolster member attached to a vehicle.

2. Description of the Related Art

Conventionally, there is proposed a variety of off-road vehicles (e.g., Recreational Off-Highway Vehicles (ROVs)).

For example, U.S. Pat. No. 2012/0085588A1 discloses a vehicle which includes a pair of front wheels, a pair of rear wheels, a frame, a roll-over protection cage and a seat. The frame is supported by the pair of front wheels and the pair of rear wheels. The roll-over protection cage and the seat are supported by the frame.

In vehicles such as the one described above, it is preferable that the vehicle has a structure for reducing sway of the driver and passengers (hereinafter, the driver and the passengers will be called crew) during the ride. In the vehicle disclosed in U.S. Pat. No. 2012/0085588A1, the roll-over protection cage has a pair of handles sandwiching the seat from both sides. The pair of handles are disposed at an approximate abdominal height of the crew sitting on the seat, so it is possible to reduce crew's sway in left or right directions.

However, in the vehicle disclosed in U.S. Pat. No. 2012/0085588A1, the handles are likely to come in contact with the crew's abdominal areas when the crew is swayed left or right. This can degrade riding comfort of the crew.

SUMMARY OF THE INVENTION

Therefore, preferred embodiments of the present invention provide a vehicle, and a shoulder bolster member, capable of reducing sway of the crew without sacrificing their riding comfort.

According to a preferred embodiment of the present invention, a vehicle includes a pair of front wheels; at least a pair of rear wheels; a frame portion supported by the pair of front wheels and the pair of rear wheels; a seat unit including a first seat portion and a second seat portion arranged side by side in a width direction of the vehicle and supported by the frame portion; a steering wheel in front of the first seat portion; a roll-over protection cage supported by the frame portion and covering an area above the seat unit and the steering wheel; and a shoulder bolster portion. In this vehicle, the first seat portion includes a seat bottom portion that supports a human body from below, and a back support portion that supports the human body from behind; at least a portion of the shoulder bolster portion is on an outer side of the seat unit in the width direction of the vehicle; at least a portion of the shoulder bolster portion is, in a side view, at a more rearward position than a forward end of the seat bottom portion, at a more forward position than the back support portion, at a higher position than a center of the steering wheel in an up-down direction, and at a lower position than an upper end of the steering wheel. Further, the shoulder bolster portion has its upper end located at a higher position than a midway point between a center of an upper surface of the seat bottom portion and an upper end of the back support portion in an up-down direction.

In a preferred embodiment of the present invention, at least a portion of the shoulder bolster portion is at a more rearward position than the forward end of the seat bottom portion; at a more forward position than the back support portion; at a higher position than the center of the steering wheel in an up-down direction; and at a lower position than the upper end of the steering wheel. Further, the shoulder bolster portion has its upper end located at a higher position than the midway point between the center of the upper surface of the seat bottom portion and the upper end of the back support portion in an up-down direction. These arrangements described above make it possible to dispose the shoulder bolster portion at the same or substantially the same height as the height of the shoulders of the driver or of a passenger, which hereinafter will be generally referred to as "crew"). Thus, the shoulders of the crew can make contact with the shoulder bolster portion when the crew is swayed in left or right directions. In other words, even when the crew is swayed in left or right directions, the arrangement reduces chances for the crew's abdominal regions to make contact with the shoulder bolster portion. As a result, the arrangement prevents swaying of the crew while providing the crew with a comfortable ride.

Preferably, the shoulder bolster portion includes a platy member. In this case, the arrangement provides a sufficient area of contact between the shoulders of the crew and the shoulder bolster portion when the shoulders of the crew make contact with the shoulder bolster portion. This provides the crew with a more comfortable ride.

Further preferably, the platy member overlaps the back support portion in a side view. In this case, the arrangement provides a larger area of contact between the shoulders of the crew and the shoulder bolster portion. This provides the crew with a more comfortable ride.

Further, preferably, the platy member overlaps the seat bottom portion in a side view. In this case, the arrangement provides a larger area of contact between the crew and the shoulder bolster portion. This provides the crew with a more comfortable ride.

Preferably, the platy member does not overlap the roll-over protection cage in a side view. In this case, the arrangement makes it possible to dispose the platy member at an outermost position as much as possible in the width direction of the vehicle without increasing the overall width of the vehicle. This provides the crew with a more comfortable ride.

Further preferably, the platy member does not overlap the seat bottom portion in a plan view. In this case, the arrangement allows for sufficient space for the crew to sit, and therefore the crew enjoys a more comfortable ride.

Further, preferably, the shoulder bolster portion includes an elongated member which is elongated in an up-down direction. In this case, the arrangement provides a sufficient area of contact between the shoulders of the crew and the shoulder bolster portion when the shoulders of the crew make contact with the shoulder bolster portion. This provides the crew with a more comfortable ride. Also, the shoulders of the crew are more likely to make contact with the shoulder bolster portion regardless of the crew's body sizes (height, for example). Therefore, the above arrangement provides the crew with a comfortable ride regardless of their body sizes.

Preferably, the elongated member includes a main portion and a sub-portion at a lower position than the main portion. With this, at least a portion of the main portion is, in a side view, at a more rearward position than the forward end of the seat bottom portion; at a more forward position than the back support portion; at a higher position than the center of the steering wheel in an up-down direction; and at a lower position than the upper end of the steering wheel. Further, at least a portion of the sub-portion is, in a side view, at a more rearward position than the forward end of the seat bottom portion; at a more forward position than the back support portion; at a higher position than the seat bottom portion; and at a lower position than a lower end of the steering wheel; and in addition, the main portion has its forward end located at a more rearward position than a forward end of the sub-portion. According to the arrangement described above, when the crew is swayed in left or right directions, the shoulders of the crew make contact with the main portion, whereas the thighs of the crew make contact with the sub-portion. This sufficiently prevents the crew from being swayed. Also, since the main portion has its forward end located at a more rearward position than the forward end of the sub portion, it is possible to provide sufficient space in front of the main portion. The arrangement allows the crew to easily pass through the space when they get on/off the vehicle. As a result, the arrangement also improves the ease of getting on/off the vehicle of the crew while providing the crew with riding comfort.

Further preferably, the frame portion includes a main frame portion supported by the pair of front wheels and the pair of rear wheels; and a seat frame portion supported by the main frame portion and supporting the seat unit. With this arrangement, the shoulder bolster portion is fixed to the seat frame portion. In this case, the arrangement provides a simple configuration of the shoulder bolster portion near the seat unit.

Further, preferably, the shoulder bolster portion includes an elongated member which is elongated in an up-down direction; the back support portion includes a seat back portion; the seat frame portion includes a back frame portion extending in an up-down direction and supporting the seat back portion; and the shoulder bolster portion is fixed to the back frame portion. In this case, the arrangement provides a simple configuration of the elongated member along the seat back portion.

Preferably, the shoulder bolster portion is fixed to the back frame portion at least at two positions spaced from each other in an up-down direction. In this case, the arrangement provides a simple configuration supporting the shoulder bolster portion strongly.

Further preferably, the shoulder bolster portion is, in its entirety, located farther inward than an outermost portion of the roll-over protection cage in the width direction of the vehicle. In this case, the arrangement makes it possible to provide the shoulder bolster portion on the vehicle without increasing the overall width of the vehicle.

Further, preferably, the shoulder bolster portion includes a first shoulder bolster member on an outer side of the first seat portion in the width direction of the vehicle; the seat frame portion includes a first seat frame supporting the first seat portion; the first seat frame is supported by the main frame portion adjustably in a fore-aft direction; and the first shoulder bolster member is fixed to the first seat frame. In this case, the first shoulder bolster member moves in the fore-aft direction with the first seat portion when a position of the first seat portion is adjusted in the fore-aft direction. Thus, sway of the driver is reduced by the first shoulder bolster member regardless of the position of the first seat portion.

Preferably, the shoulder bolster portion includes a second shoulder bolster member on an outer side of the second seat portion in the width direction of the vehicle; the seat frame portion includes a second seat frame supporting the second seat portion; and the second shoulder bolster member is fixed to the second seat frame. In this case, the arrangement provides a simple configuration of the second shoulder bolster member near the second seat portion.

Further preferably, the back support portion includes a seat back portion and a headrest portion, and the back support portion has its upper end provided by an upper end of the headrest portion. In this case, the arrangement makes it possible to position the upper end of the shoulder bolster portion at a sufficient height. Thus, the shoulders of the crew are more likely to make contact with the shoulder bolster portion even if the crew's sitting heights are high.

Further, preferably, the shoulder bolster portion includes a first shoulder bolster member on an outer side of the first seat portion in the width direction of the vehicle; and a second shoulder bolster member on an outer side of the second seat portion in the width direction of the vehicle. In this case, it is possible, with the first shoulder bolster member, to reduce sway of the driver sitting on the first seat portion, and to reduce, with the second shoulder bolster member, sway of the passenger sitting on the second seat portion. This provides a more comfortable ride of the crew (the driver and the passenger).

According to another preferred embodiment of the present invention, a vehicle includes a pair of front wheels; at least a pair of rear wheels; a frame portion supported by the pair of front wheels and the pair of rear wheels; a seat unit including a first seat portion and a second seat portion arranged side by side in a width direction of the vehicle and supported by the frame portion; a steering wheel in front of the first seat portion; a roll-over protection cage supported by the frame portion and covering an area above the seat unit and the steering wheel; a seat belt unit for the first seat portion; and a shoulder bolster portion on an outer side of the seat unit in the width direction of the vehicle. With this arrangement, the first seat portion includes a seat bottom portion and a seat back portion; the seat belt unit includes a belt member and a shoulder anchor that slidably supports the belt member at a support position higher than the seat back portion. Further, at least a portion of the shoulder bolster portion is, in a side view, at a more rearward position than a forward end of the seat bottom portion; at a more forward position than the seat back portion; at a higher position than a center of the steering wheel in an up-down direction; and at a lower position than an upper end of the steering wheel. In addition, the shoulder bolster portion has its upper end at a higher position than a midway point between a center of an upper surface of the seat bottom portion and the support position in an up-down direction.

In the present preferred embodiment of the present invention, at least a portion of the shoulder bolster portion is at a more rearward position than the forward end of the seat bottom portion; at a more forward position than the back support portion; at a higher position than the center of the steering wheel in an up-down direction; and at a lower position than the upper end of the steering wheel. Further, the shoulder bolster portion has its upper end at a higher position than the midway point between the center of the upper surface of the seat bottom portion and the belt supporting position by the shoulder anchor in an up-down direction. The arrangement makes it possible to dispose the shoulder bolster portion at a height equal to or substantially equal to the height of the crew's shoulders. Thus, the shoulders of the crew can make contact with the shoulder bolster portion when the crew is swayed in left or right directions. In other words, even when the crew is swayed in left or right directions, the arrangement reduces chances for the crew's abdominal regions to make contact with the shoulder bolster portion. As a result, the arrangement prevents swaying of the crew while providing the crew with a comfortable ride.

According to still another preferred embodiment of the present invention, a shoulder bolster member is provided for a vehicle which includes a seat unit including a seat bottom portion that supports a driver from below and a back support portion that supports the driver from behind; and a roll-over protection cage covering an area above the seat unit. The shoulder bolster member is to be disposed on an outer side of the seat unit, and includes a mounting portion that attaches the shoulder bolster member to the vehicle such that at least a portion of the shoulder bolster member is, in a side view of the vehicle, at a more rearward position than a forward end of the seat bottom portion; at a more forward position than the back support portion; at a higher position than a center of the steering wheel in an up-down direction; and at a lower position than an upper end of the steering wheel; and an upper end of the shoulder bolster portion is at a higher position than a midway point between a center of an upper surface of the seat bottom portion and an upper end of the back support portion in an up-down direction.

According to a shoulder bolster member according to a preferred embodiment of the present invention, at least a portion of the shoulder bolster member is located at a more rearward position than the forward end of the seat bottom portion; at a more forward position than the back support portion; at a higher position than the center of the steering wheel in an up-down direction; and at a lower position than the upper end of the steering wheel as the shoulder bolster member is attached to the vehicle. Further, the shoulder bolster member has its upper end at a higher position than the midway point between the center of the upper surface of the seat bottom portion and the upper end of the back support portion in an up-down direction as the shoulder bolster member is attached to the vehicle. By attaching the shoulder bolster member to the vehicle in a fashion as described above, the shoulder bolster member is disposed at the same or substantially the same height as the height of the shoulders of the driver or of a passenger (hereinafter will be called crew). Thus, the shoulders of the crew can make contact with the shoulder bolster member when the crew is swayed in left or right directions. In other words, even when the crew is swayed in left or right directions, the arrangement reduces chances for the crew's abdominal regions to make contact with the shoulder bolster member. As a result, the arrangement prevents swaying of the crew while providing the crew with a comfortable ride.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
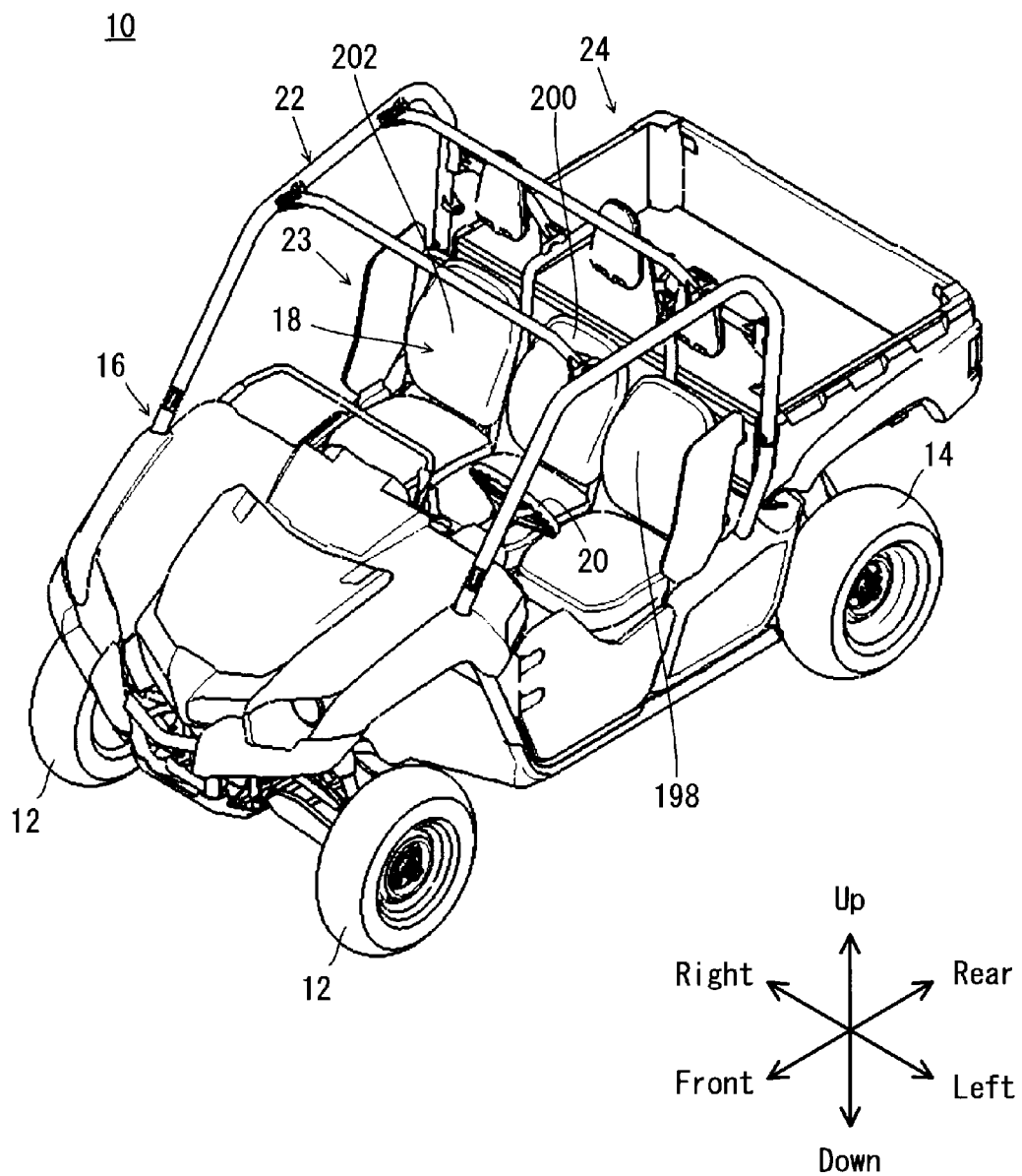
FIG. 1 is a perspective view of a vehicle according to a preferred embodiment of the present invention.

Hereinafter, preferred embodiments of the present invention will be described with reference to the drawings. It is noted that the terms front and rear, right and left, up and down as used in the preferred embodiments of the present invention are determined from the driver's position on a seat portion 198 of a vehicle 10, with the driver facing toward a steering wheel 20.

Referring to FIG. 1 through FIG. 5, the vehicle 10 according to a preferred embodiment of the present invention preferably is a four-wheel-drive recreational off-highway vehicle (ROV), for example, and includes a pair of front wheels 12, a pair of rear wheels 14, a frame portion 16, a seat unit 18, a steering wheel 20, a roll-over protection cage 22, a shoulder bolster portion 23 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
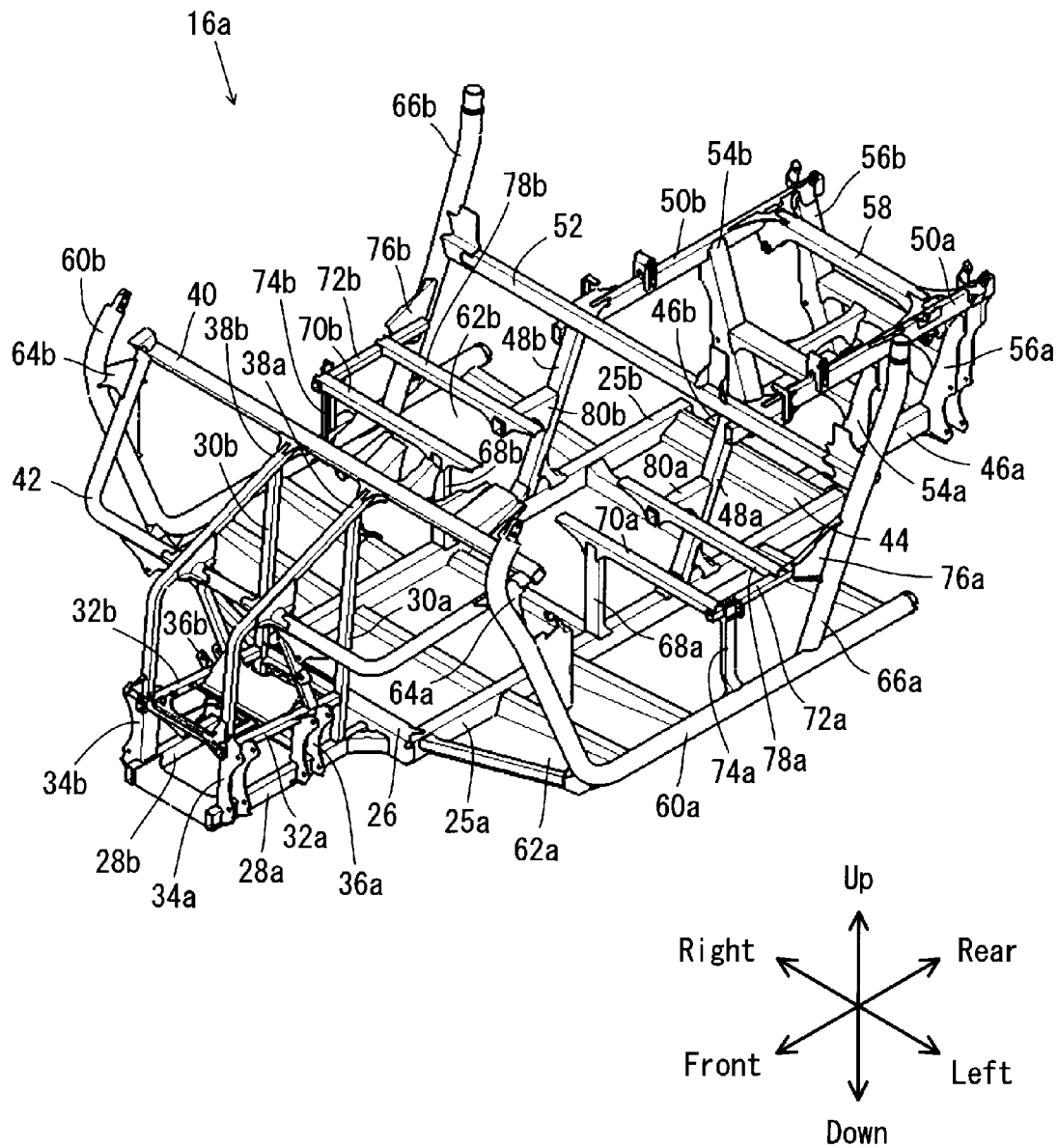
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 includes two end regions connected to respective end regions of the cross member 40. The U-shaped or substantially U-shaped frame portion 42 includes an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are located farther outward than the side frame portions 46a, 46b. The cargo bed 24 (see FIG. 1) is supported by the side frame portions 50a, 50b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a includes an end region (left end region in the present preferred embodiment) connected to a forward end region of a support frame portion 72a which extends in a fore-aft direction, whereas the support frame portion 70b includes an end region (right end region in the present preferred embodiment) connected to a forward end region of a support frame portion 72b which extends in a fore-aft direction.

The support frame portion 72a includes a forward region connected to the support frame portion 60a by a support frame portion 74a which extends in an up-down direction, whereas the support frame portion 72b includes a forward region connected to the support frame portion 60b by a support frame portion 74b which extends in an up-down direction. The support frame portion 72a includes a rearward region connected to the support frame portion 66a via a connecting member 76a, whereas the support frame portion 72b includes a rearward region connected to the support frame portion 66b via a connecting member 76b.

Behind the support frame portion 70a, a support frame portion 78a is parallel or substantially parallel to the support frame portion 70a, whereas behind the support frame portion 70b, a support frame portion 78b is parallel or substantially parallel to the support frame portion 70b. The support frame portion 78a includes an end region (left end region in the present preferred embodiment) connected to the support frame portion 72a, whereas the support frame portion 78b includes an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. Referring to FIG. 1, the steering wheel 20 is in front of the seat portion 198, which will be described later, of the seat unit 18. The roll-over protection cage 22 covers an area above the seat unit 18 and the steering wheel 20. The roll-over protection cage 22 is supported by the frame portion 16.

Figure 8:
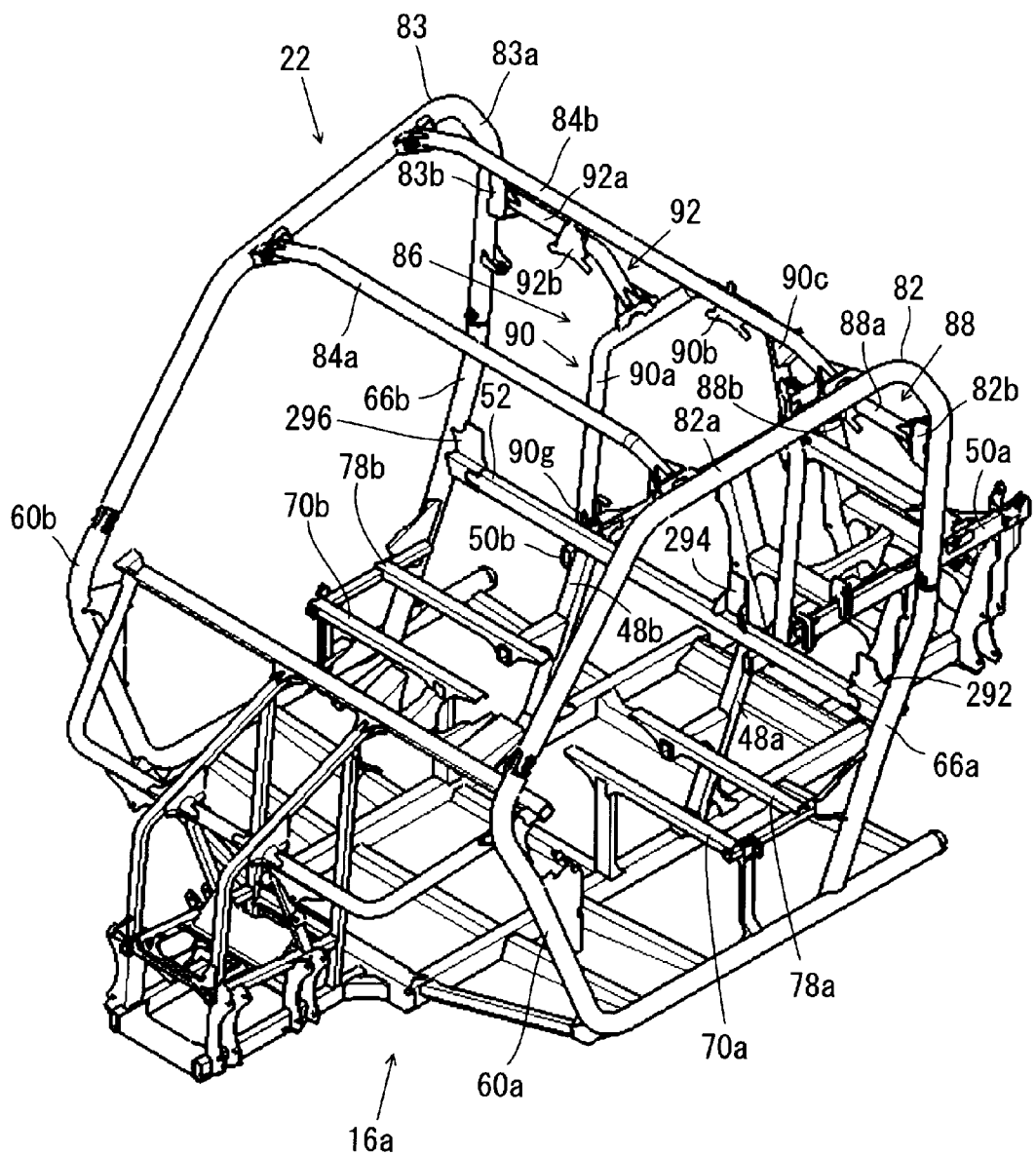
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a includes an end region (forward end region in the present preferred embodiment), which is connected to an upper end region of the support frame portion 60a; and the main body portion 82a includes another end region (rearward end region in the present preferred embodiment), which is connected to an upper end region of the support frame portion 66a. The main body portion 82a is fixed to the support frame portions 60a, 66a with, e.g., fasteners (such as bolts and nuts). Likewise, the main body portion 83a includes an end region (forward end region in the present preferred embodiment), which is connected to an upper end region of the support frame portion 60b; and the main body portion 83a includes another end region (rearward end region in the present preferred embodiment), which is connected to an upper end region of the support frame portion 66b. The main body portion 83a is fixed to the support frame portions 60b, 66b with, e.g., fasteners (such as bolts and nuts).

The roof members 84a, 84b connect an upper region of the side cage member 82 to an upper region of the side cage member 83. The roof member 84b is at a more rearward position than the roof member 84a. The roof member 84b is at a higher position than a back support portion 210 to be described later (see FIG. 18) of the seat unit 18.

Figure 3:
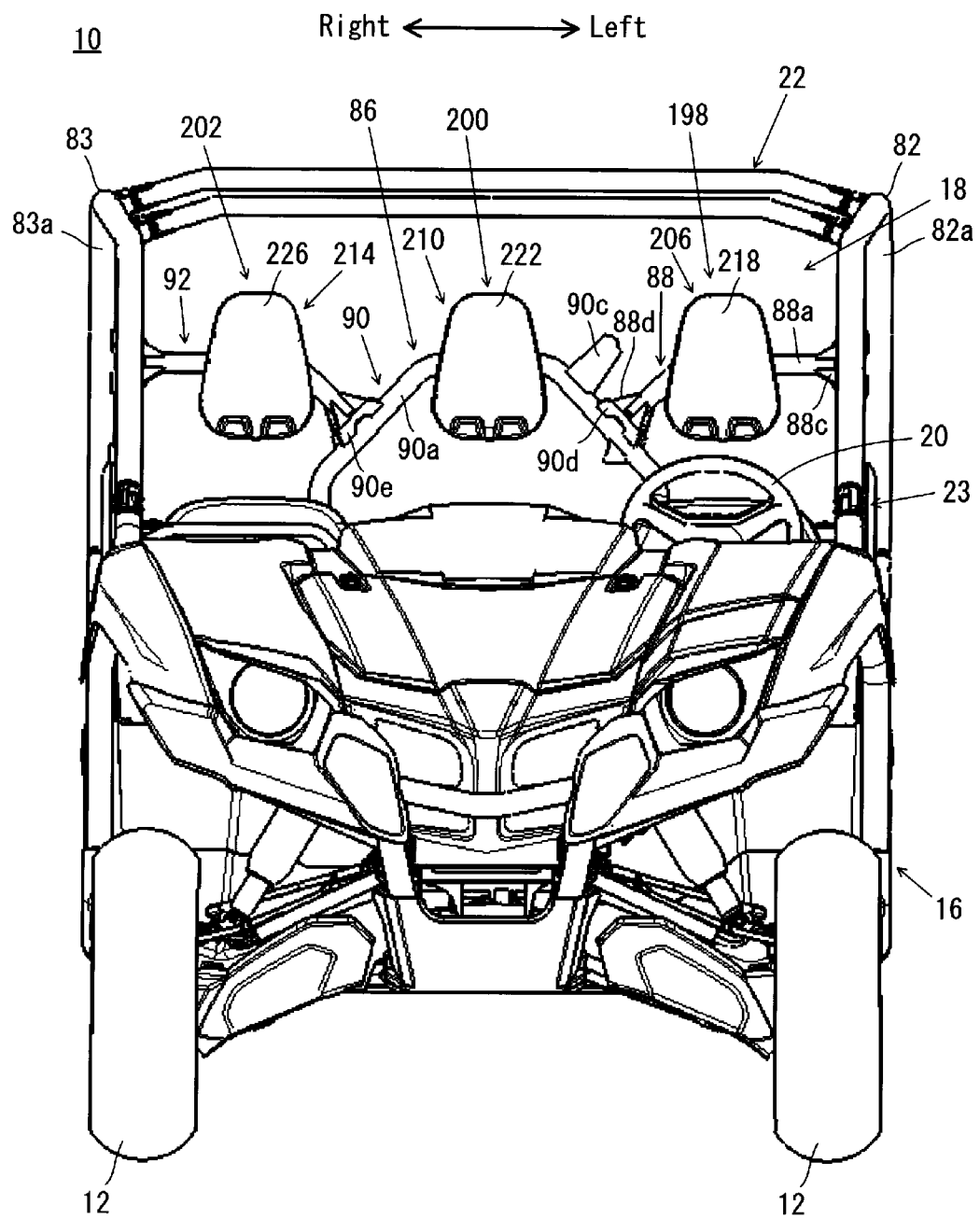
FIG. 3 is a front view of the vehicle.
Figure 5:
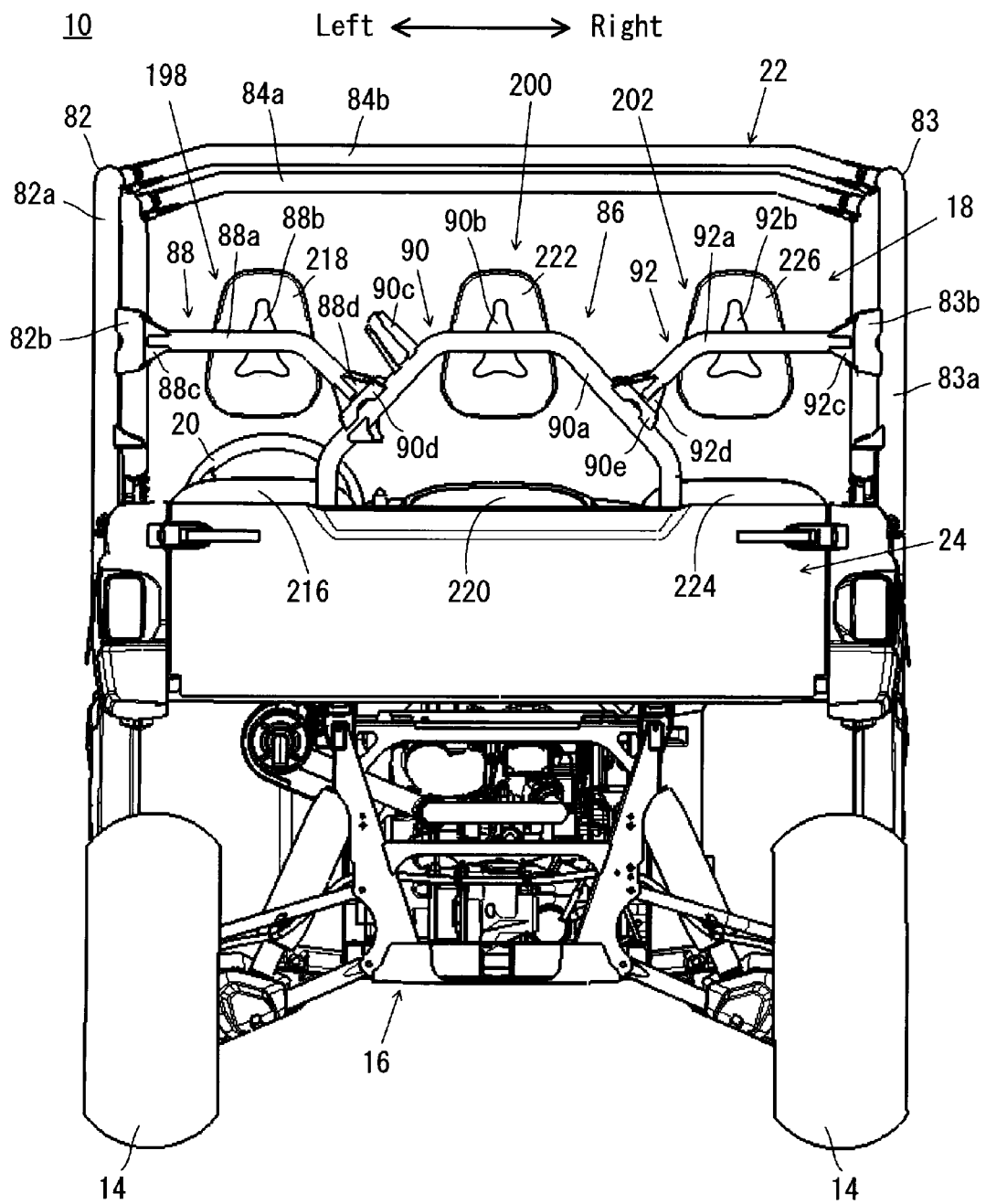
FIG. 5 is a rear view of the vehicle.
Figure 6:
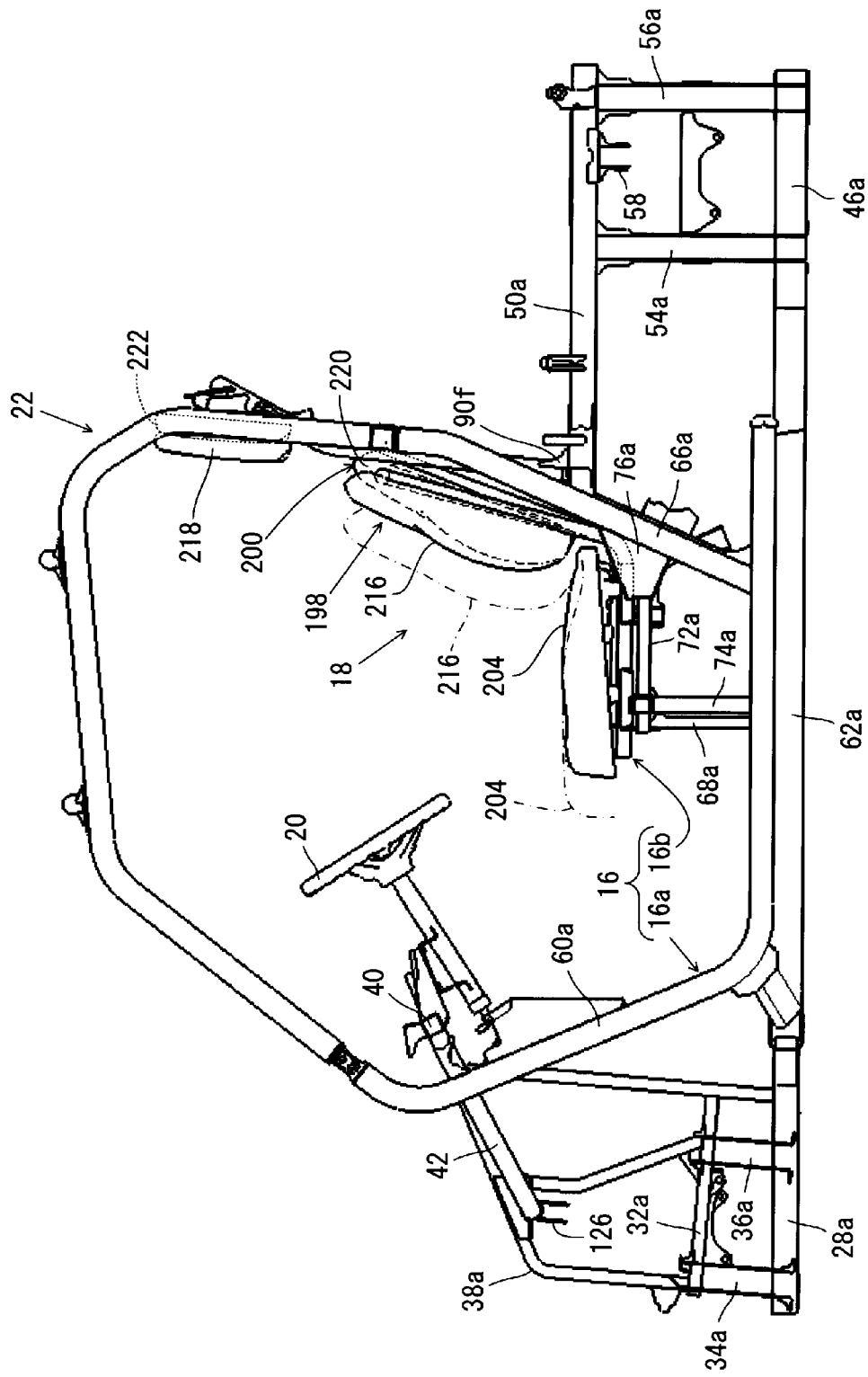
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present preferred embodiment) of the main body portion 88a; and a connecting portion 88d fixed to another end region (right end region in the present preferred embodiment) of the main body portion 88a. To the mounting portion 88b, a headrest portion 218, which will be described later, of the seat unit 18 is attached. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts, for example. The connecting portion 88d is connected to a connecting portion 90d, which will be described later, of the support member 90 with unillustrated fasteners (such as bolts and nuts).

Figure 4:
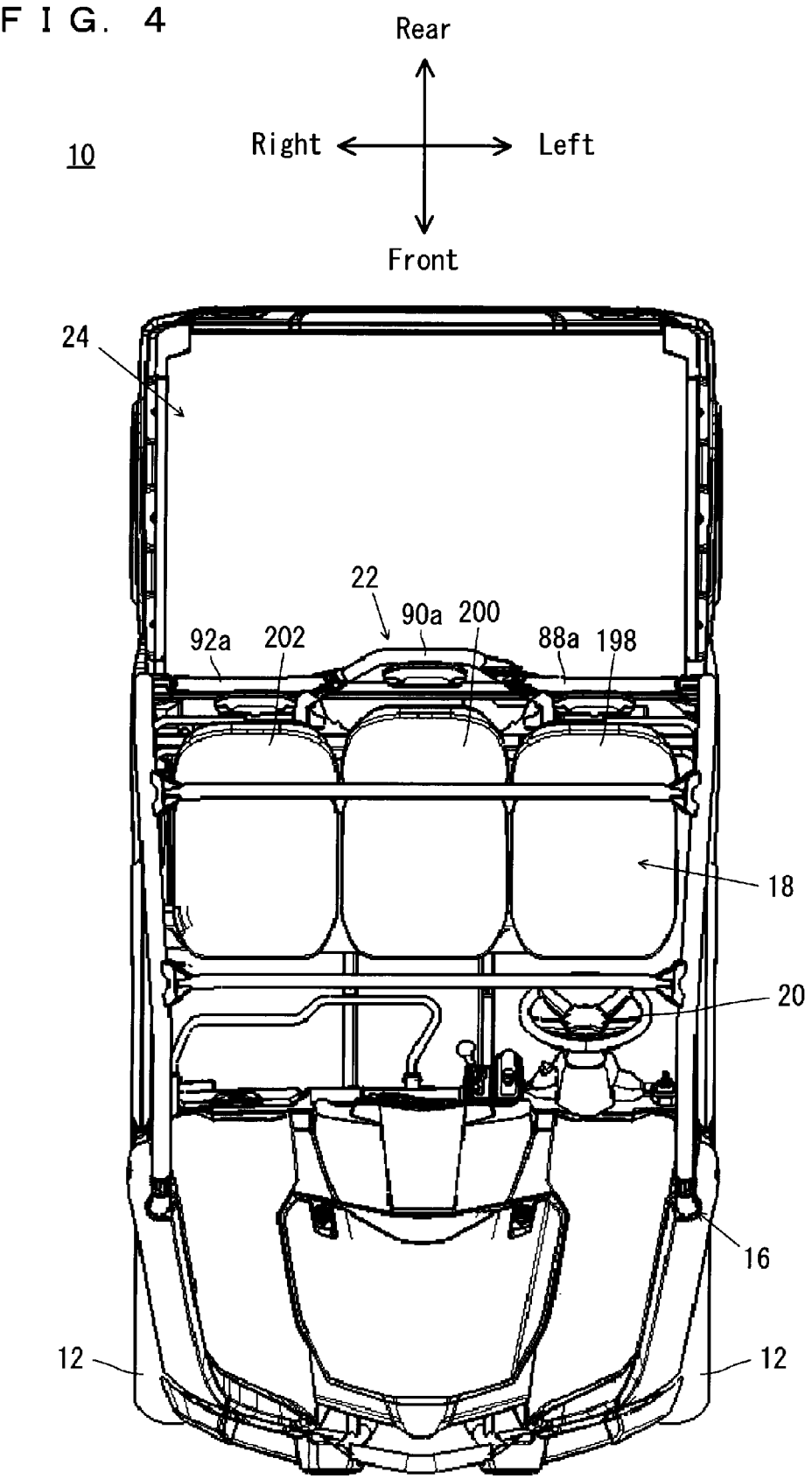
FIG. 4 is a plan view of the vehicle.

Referring to FIG. 5 and FIG. 8, the support member 90 includes a main body portion 90a which has a shape of an inverted letter of U or a shape substantially of an inverted letter of U, in a front view; a mounting portion 90b located at an upper end region, i.e., an intermediate region, of the main body portion 90a; and a mounting portion 90c which extends obliquely upward from the main body portion 90a on a side closer to the support member 88 when viewed from the mounting portion 90b. Referring to FIG. 4, the upper end region of the main body portion 90a is at a more rearward position than the main body portion 88a and a main body portion 92a to be described later. Therefore, referring to FIG. 5 and FIG. 8, the mounting portion 90b is at a more rearward position than the mounting portion 88b and a mounting portion 92b to be described later.

Referring to FIG. 5, a headrest portion 222, which will be described later, of the seat unit 18 is attached to the mounting portion 90b. To the mounting portion 90c, a shoulder anchor 288c which will be described later (see FIG. 25) is attached.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts), for example.

Referring to FIG. 6 and FIG. 8, the support member 90 further includes a pair of connecting portions 90f, 90g fixed to two end regions of the main body portion 90a. The main body portion 90a includes two end regions connected detachably from/attachably to the side frame portions 50a, 50b via the connecting portions 90f, 90g. Specifically, the connecting portions 90f, 90g of the support member 90 are connected to the side frame portions 50a, 50b with unillustrated fasteners (such as bolts and nuts), for example.

Referring to FIG. 5, the support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. To the mounting portion 92b, a headrest portion 226, which will be described later, of the seat unit 18 is attached. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 12, the vehicle 10 further includes a pair of suspension assemblies 94a, 94b which suspend the pair of front wheels 12 (see FIG. 1); a rotation transmission portion 96 which transmits rotation from an engine 178 (see FIG. 13), which will be described later, to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 10:
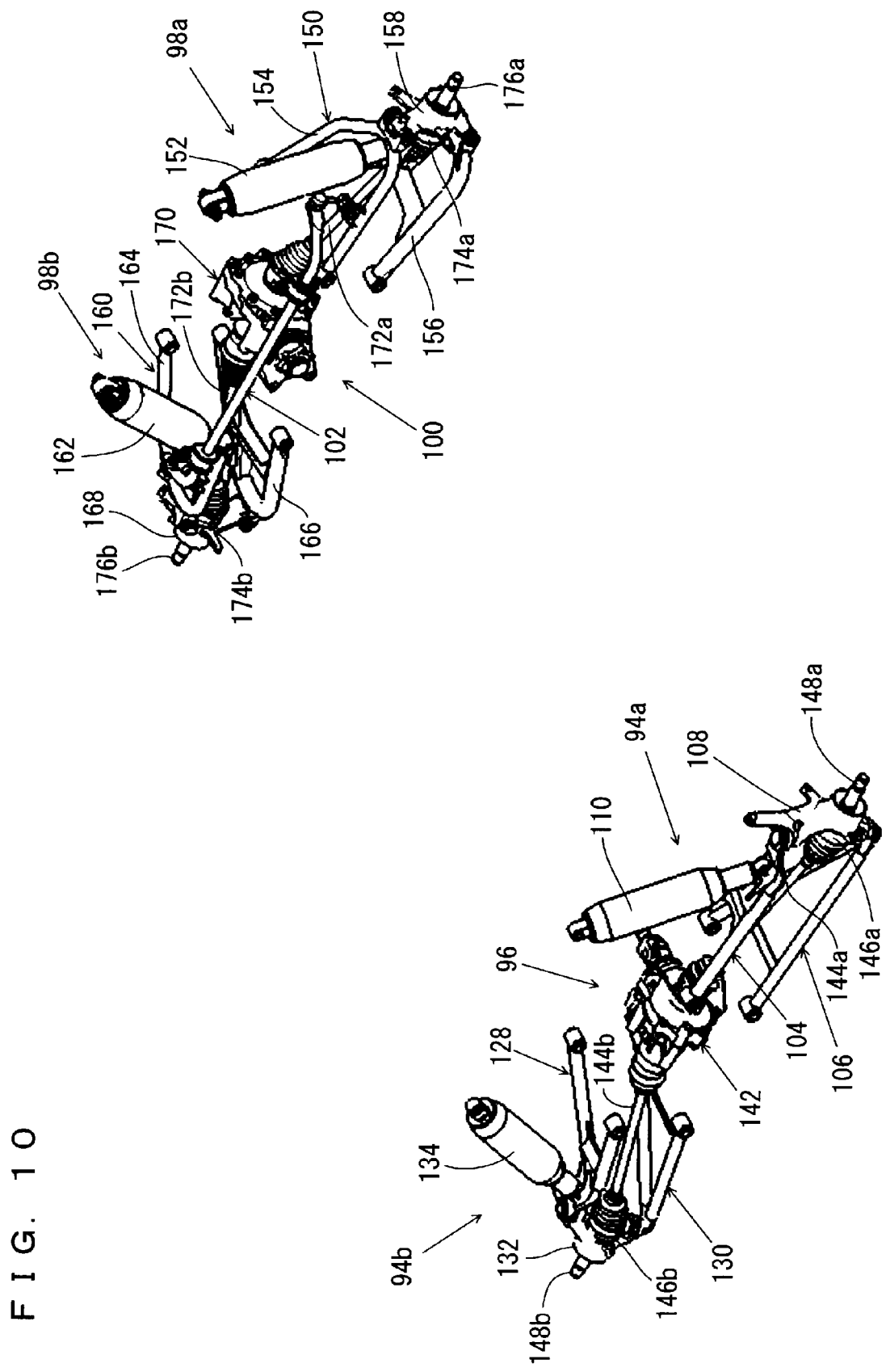
FIG. 10 is a perspective view showing the pair of suspension assemblies for front wheels and the pair of suspension assemblies for rear wheels.
Figure 11:
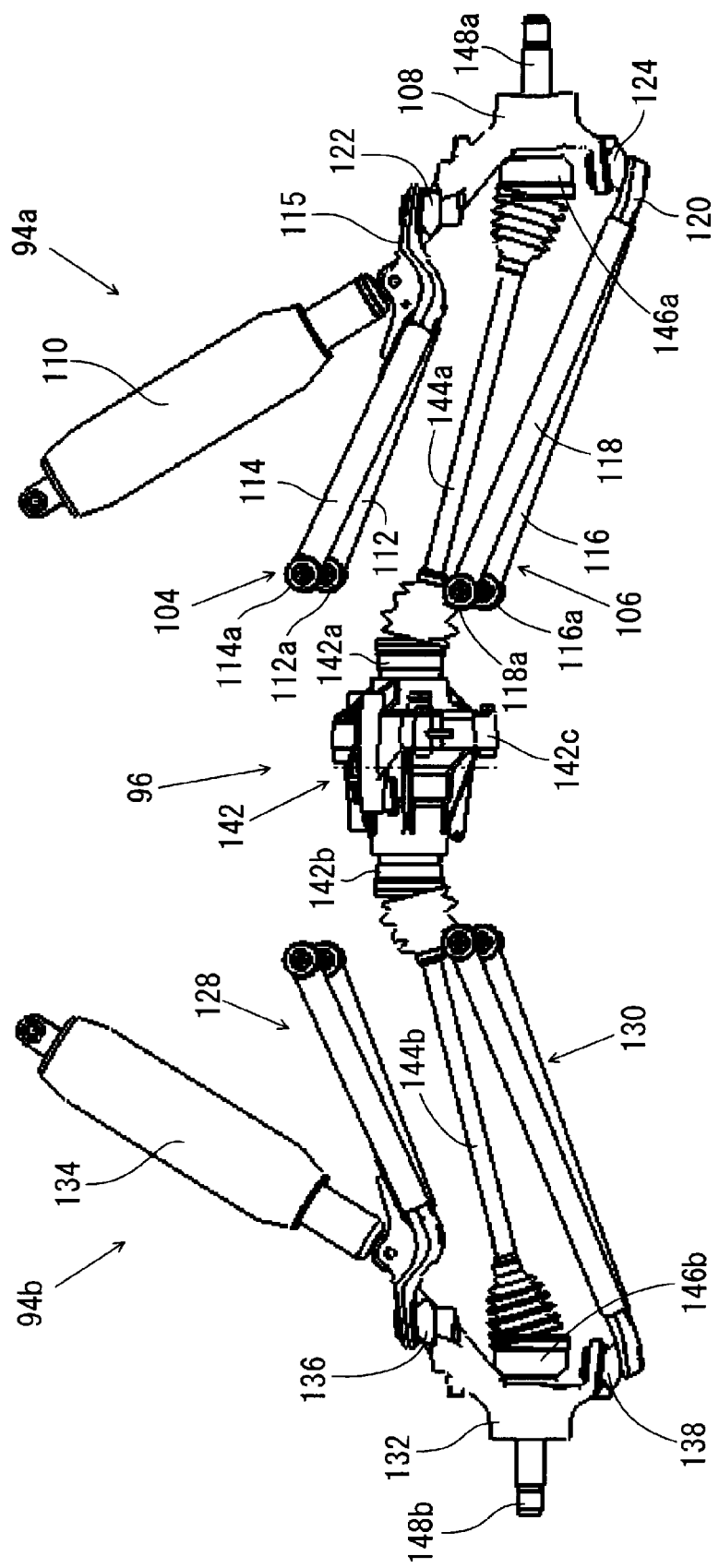
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms, for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
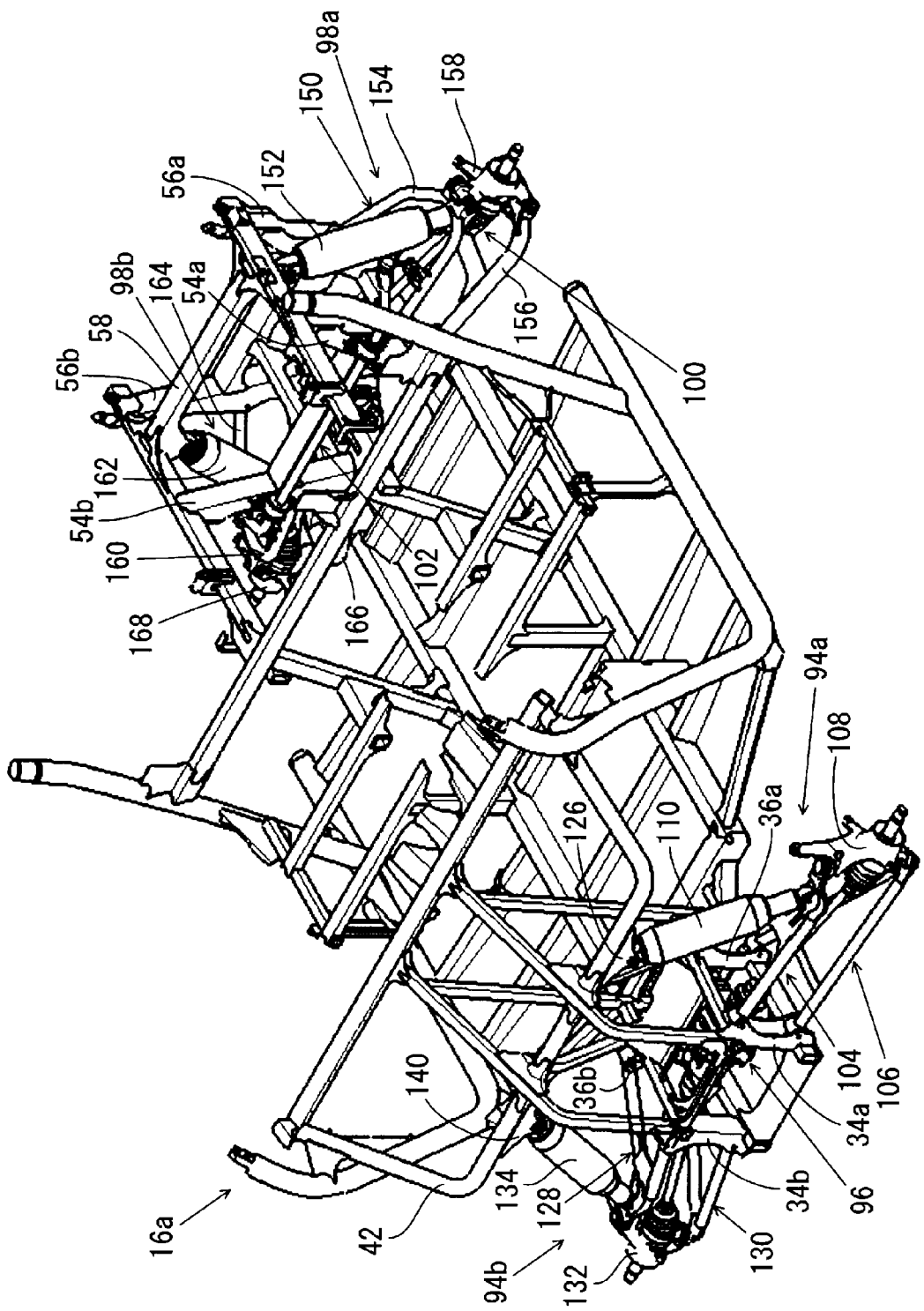
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U or substantially of an inverted letter of U in a side view, and is fixed to the U-shaped frame or substantially U-shaped portion 42.

Referring to FIG. 10 and FIG. 11, the suspension assembly 94b preferably is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U or substantially an inverted letter of U in a side view, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is between the suspension assembly 94a and the suspension assembly 94b in the width direction of the vehicle 10. The differential device 142 is supported by the main frame portion 16a. The differential device 142 is connected to the engine 178 (see FIG. 13) which will be described later, via a propeller shaft 180 (see FIG. 13) which will be described later.

Referring to FIG. 11, the differential device 142 includes a pair of constant-velocity joints 142a, 142b and a main body portion 142c. The constant-velocity joint 142a is on a left end region of the main body portion 142c, whereas the constant-velocity joint 142b is on a right end region of the main body portion 142c. The drive shafts 144a, 144b extend in a left-right direction, to connect the constant-velocity joints 142a, 142b with the constant-velocity joints 146a, 146b. More specifically, the drive shaft 144a extends obliquely in a leftward and downward direction from the constant-velocity joint 142a and is connected to the constant-velocity joint 146a, whereas the drive shaft 144b extends obliquely in a rightward and downward direction from the constant-velocity joint 142b and is connected to the constant-velocity joint 146b. The drive shaft 144a passes below the upper arm 104 and above the lower arm 106, whereas the drive shaft 144b passes below the upper arm 128 and above the lower arm 130. In the present preferred embodiment, in a front view, the drive shaft 144a passes between the upper arm 104 and the lower arm 106, whereas the drive shaft 144b passes between the upper arm 128 and the lower arm 130.

The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be any known components, so the suspension assemblies 98a, 98b and the rotation transmission portion 100 will be described only briefly.

Figure 12:
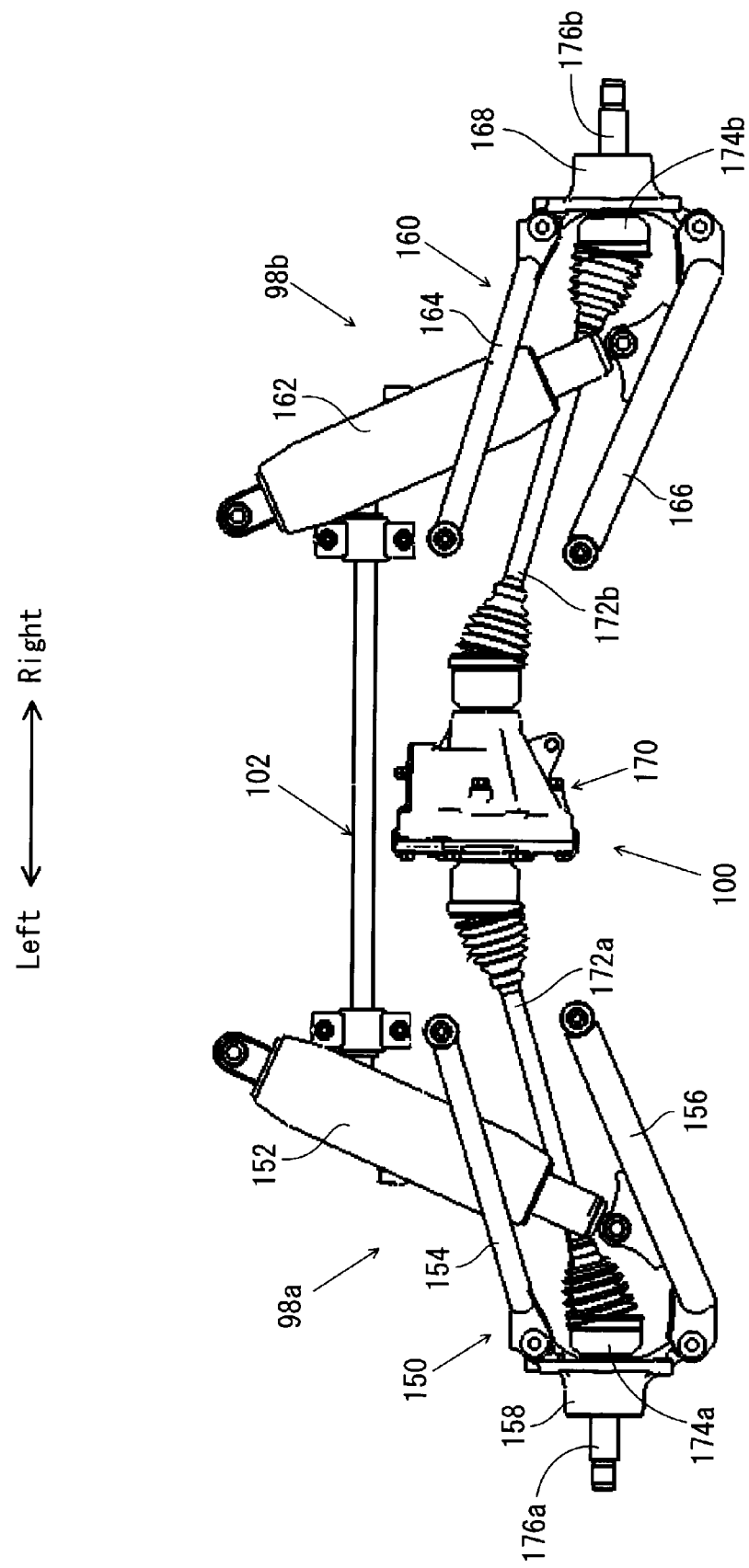
FIG. 12 is a rear view showing the pair of suspension assemblies for rear wheels, the rotation transmission portion for the rear wheels, and a rear stabilizer.

Referring to FIG. 10 and FIG. 12, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10 and FIG. 12, the suspension assembly 98b preferably is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other.

Referring to FIG. 10 and FIG. 12, the rotation transmission portion 100 includes a differential device 170, a pair of drive shafts 172a, 172b, a pair of constant-velocity joints 174a, 174b, and a pair of axles 176a, 176b. The differential device 170 is between the suspension assembly 98a and the suspension assembly 98b in the width direction of the vehicle 10. The differential device 170 is supported by the main frame portion 16a. The differential device 170 is connected to the engine 178 (see FIG. 13) which will be described later, via a propeller shaft 182 (see FIG. 13) which will be described later.

The drive shafts 172a, 172b connects the differential device 170 with the constant-velocity joints 174a, 174b. The constant-velocity joint 174a and the axle 176a are connected to each other and are supported rotatably by the knuckle arm 158. The constant-velocity joint 174b and the axle 176b are connected to each other and are supported rotatably by the knuckle arm 168. The axle 176a supports the left rear wheel 14 (see FIG. 5), whereas the axle 176b supports the right rear wheel 14 (see FIG. 5).

Figure 13:
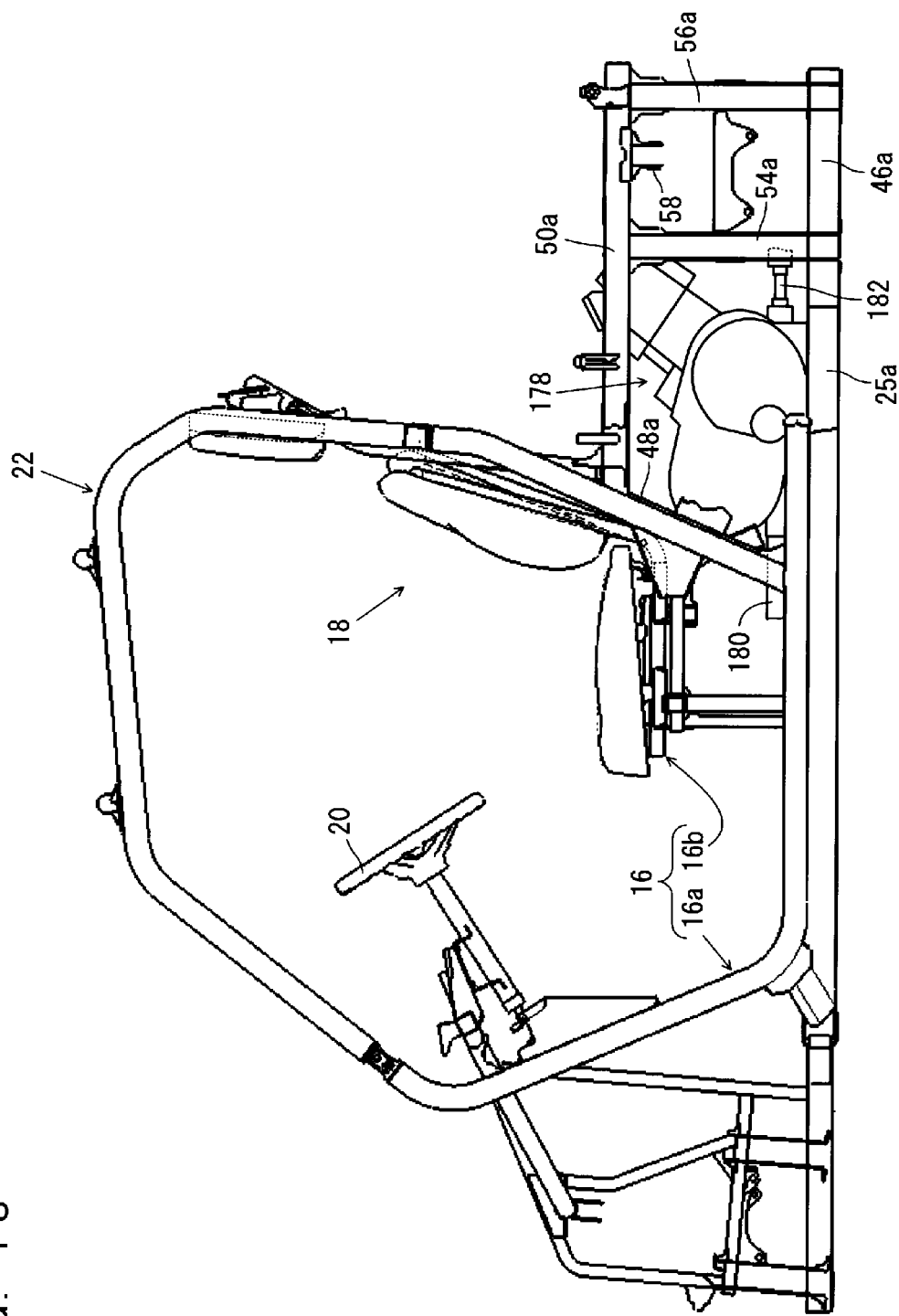
FIG. 13 is a side view showing the frame portion, the seat unit, the steering wheel, the roll-over protection cage, an engine and a pair of propeller shafts.
Figure 14:
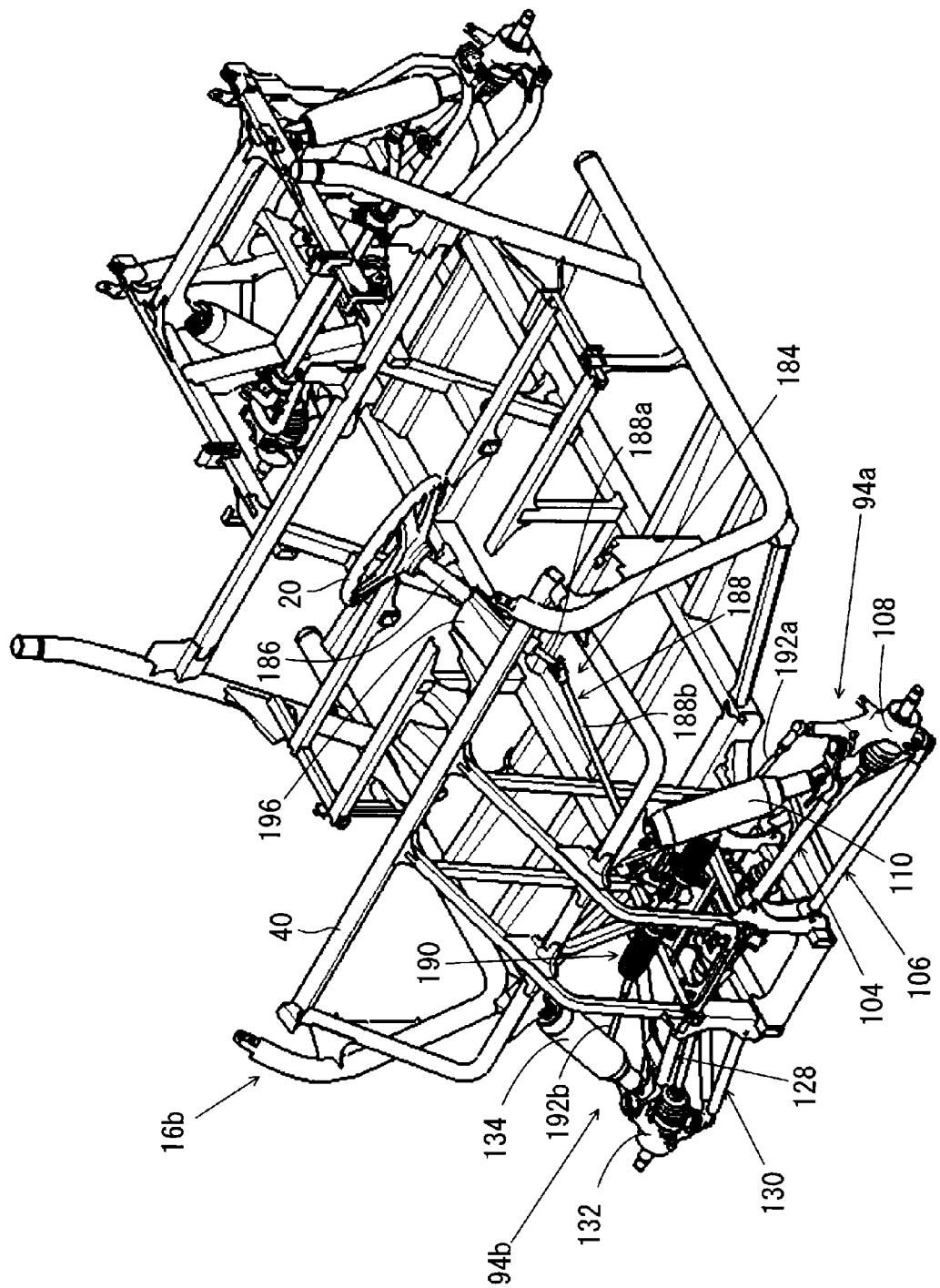
FIG. 14 is a perspective view of the main frame portion, showing a state where the steering wheel and a transfer mechanism are mounted thereon.
Figure 15:
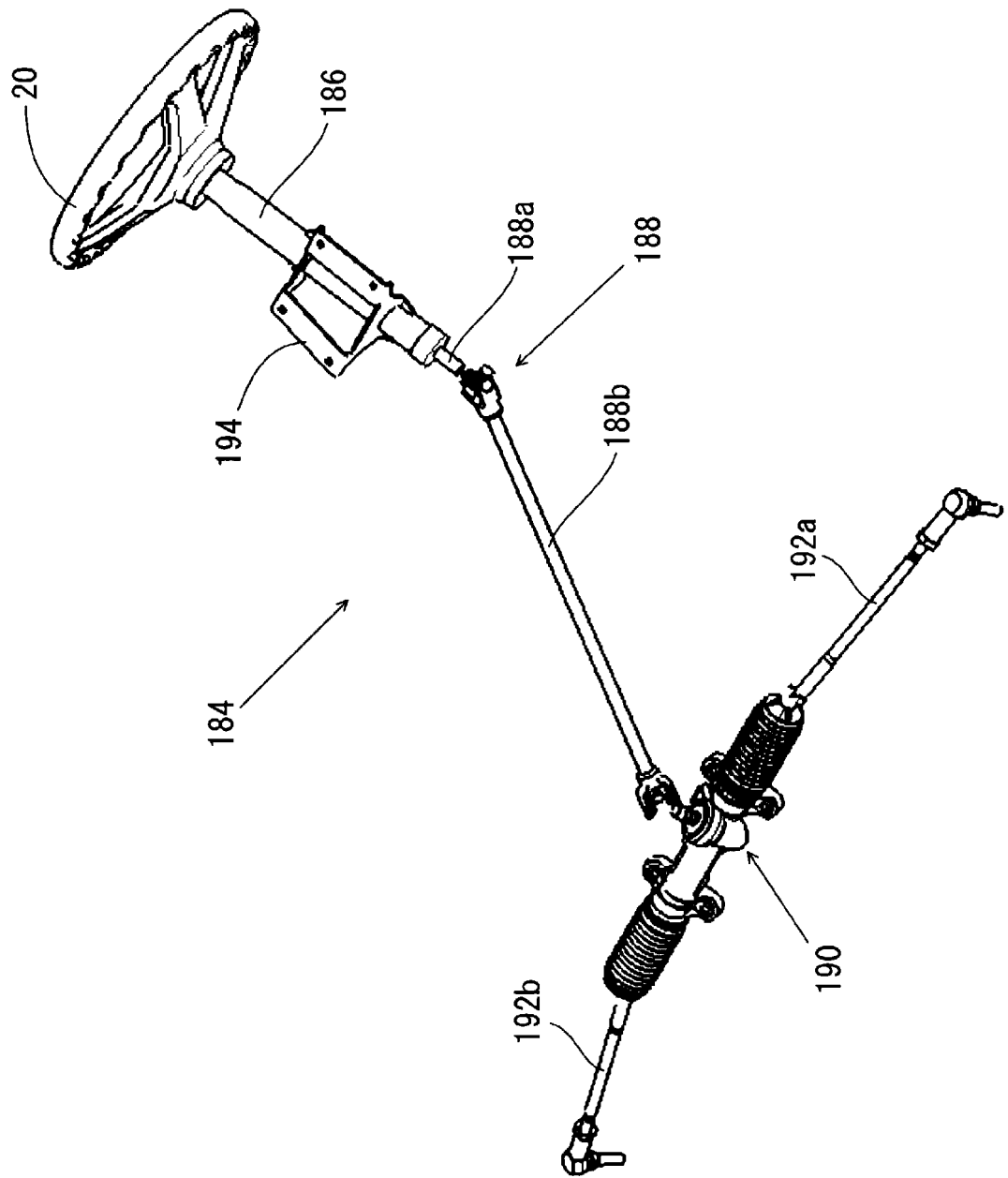
FIG. 15 is a perspective view of the steering wheel and the transfer mechanism.
Figure 16:
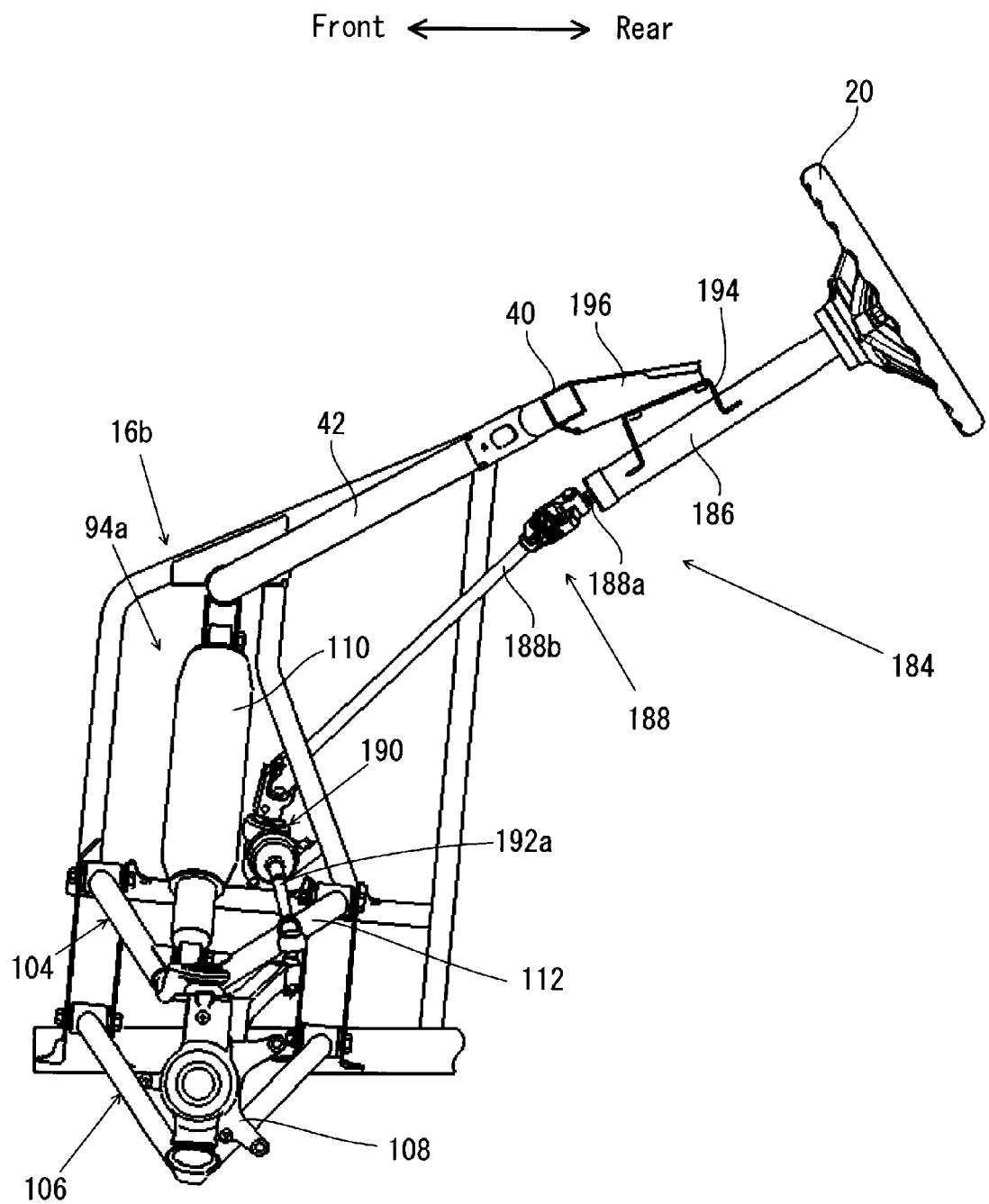
FIG. 16 is a side view showing an arrangement of the transfer mechanism and a surrounding area.
Figure 17:
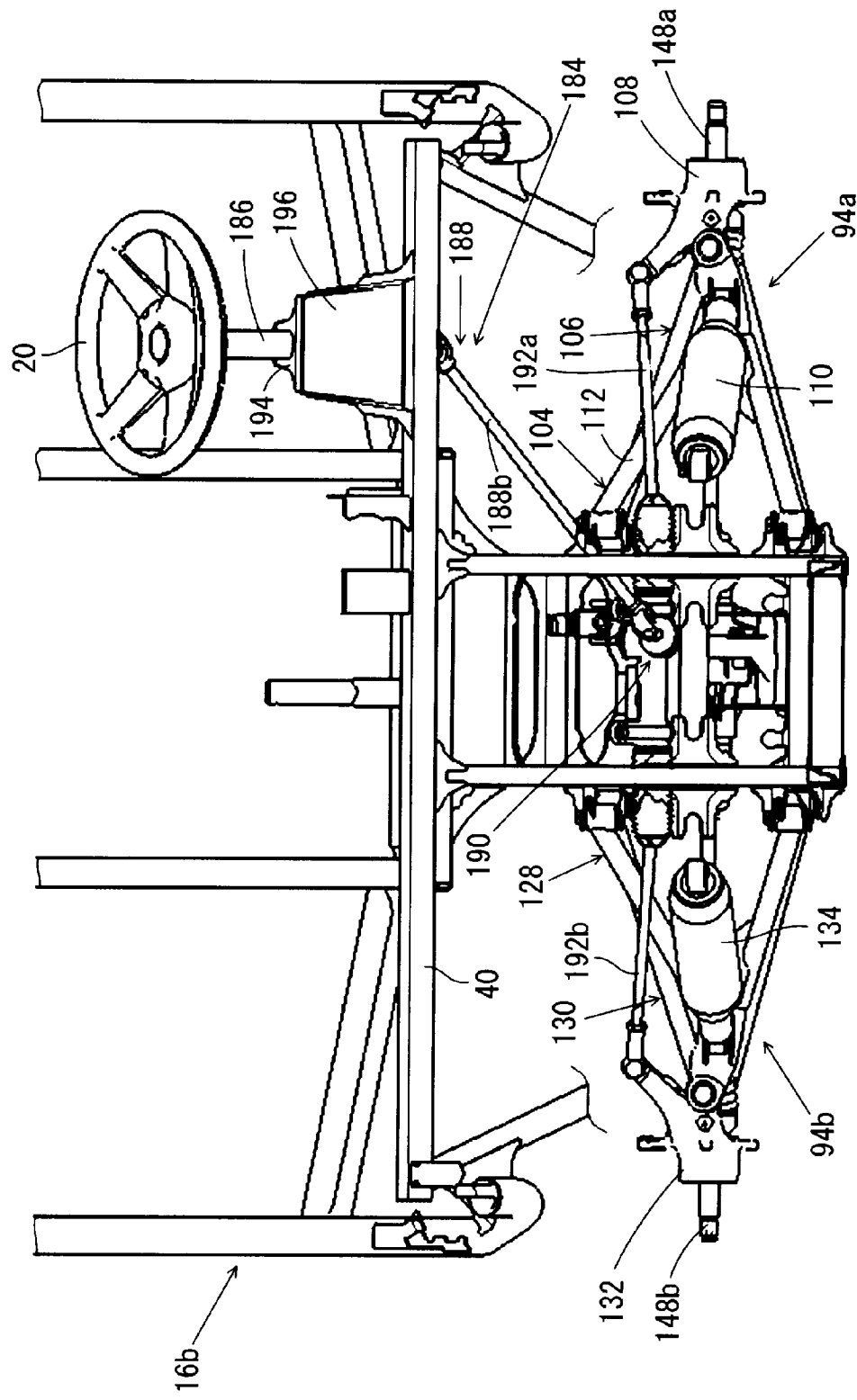
FIG. 17 is a plan view showing the arrangement of the transfer mechanism and a surrounding area.

Referring to FIG. 13, the engine 178 is supported at a rearward region of the main frame portion 16a. Referring to FIG. 7 and FIG. 13, a majority of the engine 178 is within a space surrounded by the side frame portions 25a, 25b, the side frame portions 46a, 46b, the support frame portions 48a, 48b, the side frame portions 50a, 50b, and the support frame portions 54a, 54b. In the present preferred embodiment, at least a portion of the engine 178 is at a more rearward position than the roll-over protection cage 22.

Referring to FIG. 13, the propeller shaft 180 extends forward from a lower end region of the engine 178, whereas the propeller shaft 182 extends rearward from a lower end region of the engine 178. In order to avoid complication in the drawing, the propeller shaft 180 and the propeller shaft 182 are illustrated only partially in FIG. 13.

The propeller shaft 180 is connected to the differential device 142 (see FIG. 10), whereas the propeller shaft 182 is connected to the differential device 170 (see FIG. 10). Referring to FIG. 11 and FIG. 13, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12 and FIG. 13, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14 through FIG. 17, the vehicle 10 further includes a transfer mechanism 184 which transmits movements of the steering wheel 20 to the pair of front wheels 12. The transfer mechanism 184 can be any known rack and pinion type transfer mechanism, for example. Therefore, the transfer mechanism 184 will be described only briefly. The transfer mechanism 184 includes a steering column portion 186, a steering shaft portion 188, a rack-and-pinion portion 190 and a pair of tie rods 192a, 192b.

The steering column portion 186 is hollow, rotatably supporting the steering wheel 20. The steering column portion 186 is supported by a cross member 40 of the frame portion 16 via brackets 194, 196.

The steering shaft portion 188 includes a first shaft 188a and a second shaft 188b. The first shaft 188a is inserted into the steering column portion 186 rotatably. The first shaft 188a has an upper end region (not illustrated) connected to the steering wheel 20. The first shaft 188a has a lower end region connected to an upper end region of the second shaft 188b.

The second shaft 188b has a lower end region connected to the rack-and-pinion portion 190. Since the rack-and-pinion portion 190 can be any known rack-and-pinion portion, the rack-and-pinion portion 190 will not be described in any more detail. The tie rods 192a, 192b pass behind the shock absorbers 110, 134 and above the upper arms 104, 128, to connect the rack-and-pinion portion 190 with the knuckle arms 108, 132.

Movement of the steering wheel 20 is transmitted through the steering shaft portion 188, the rack-and-pinion portion 190 and the pair of tie rods 192a, 192b, to the knuckle arms 108, 132. Then the knuckle arms 108, 132 pivots in a left-right direction, to steer the pair of front wheels 12.

Figure 18:
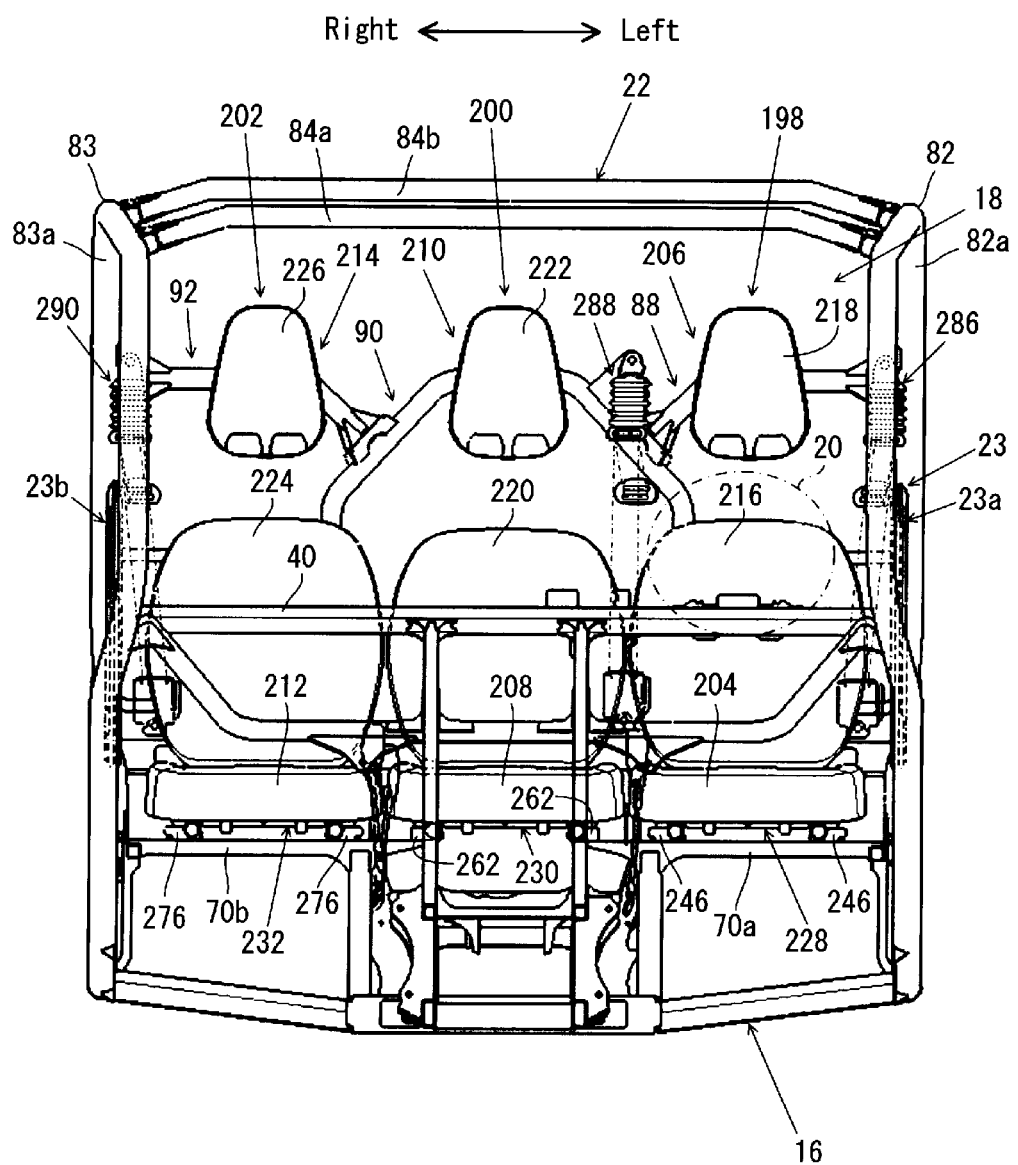
FIG. 18 is a front view showing the frame portion, the seat unit, the roll-over protection cage and a shoulder bolster portion.
Figure 19:
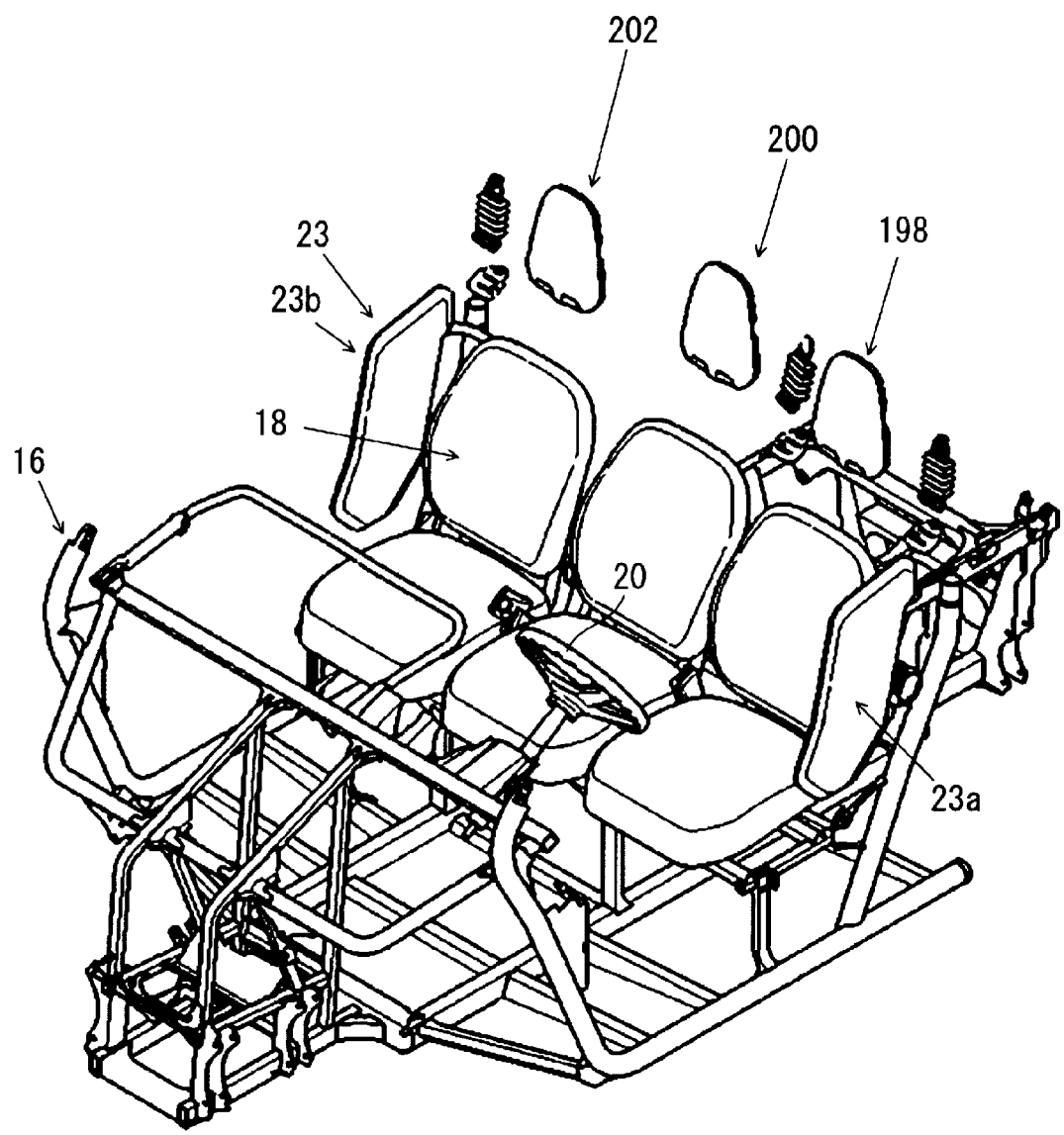
FIG. 19 is a perspective view showing the frame portion, the seat unit and the shoulder bolster portion.

Referring to FIG. 18 through FIG. 21, the seat unit 18 includes a plurality (for example, three in the present preferred embodiment) of seat portions 198, 200, 202 arranged side by side in this order in the width direction of the vehicle 10. In the width direction of the vehicle 10, the seat portion 200 is in the middle of the seat unit 18. In other words, the seat portion 200 is adjacent to the seat portion 198 and is adjacent to the seat portion 202 in the width direction of the vehicle 10. When viewed from the seat portion 200, the seat portion 202 is on the side spaced away from the seat portion 198. Referring to FIG. 18 and FIG. 19, the steering wheel 20 is in front of the seat portion 198. Specifically, in the present preferred embodiment, the seat portion 198 is a seat portion for the driver, whereas the seat portions 200, 202 are seat portions for passengers.

Figure 20:
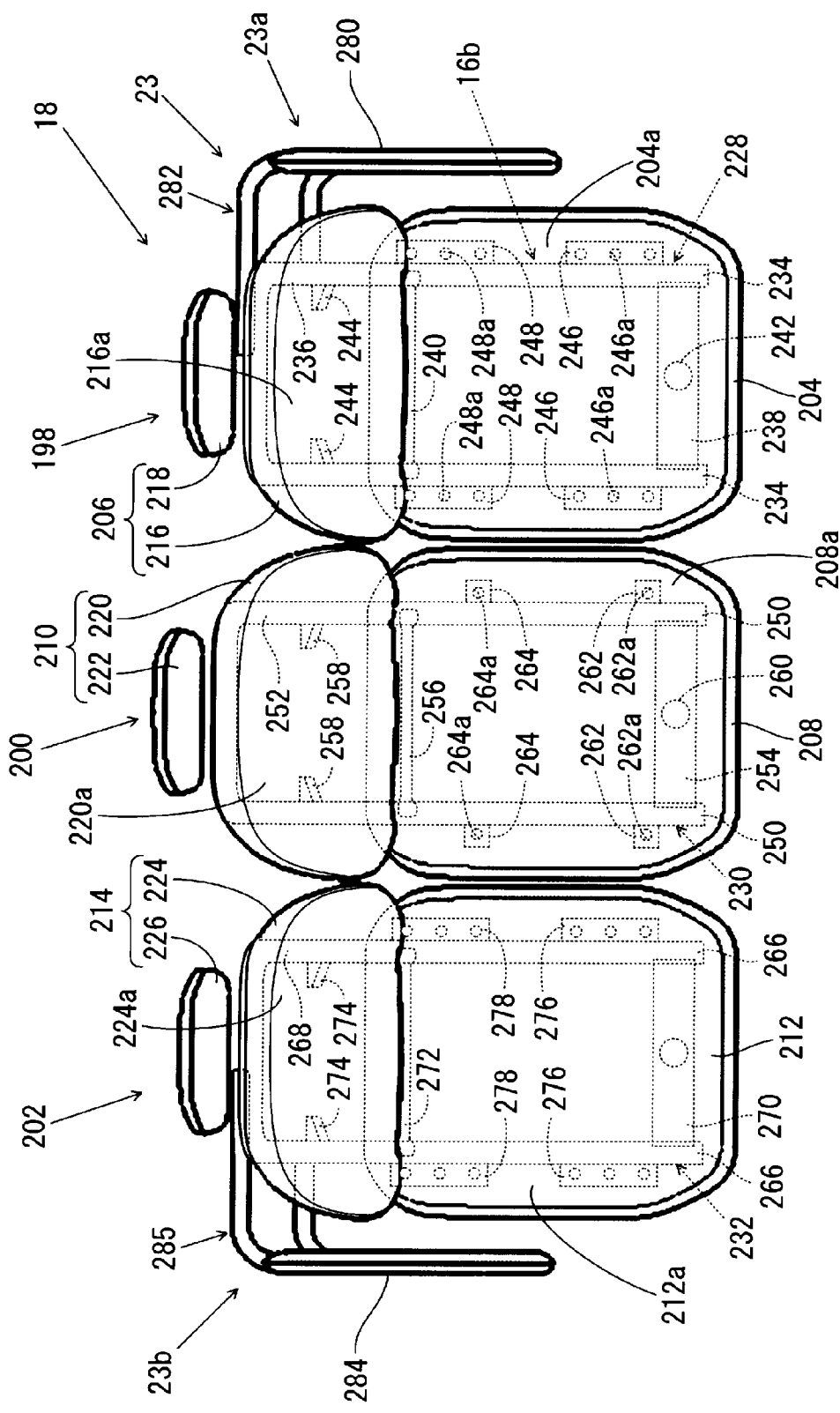
FIG. 20 is a plan view showing a seat frame portion, the seat unit and the shoulder bolster portion.
Figure 21:
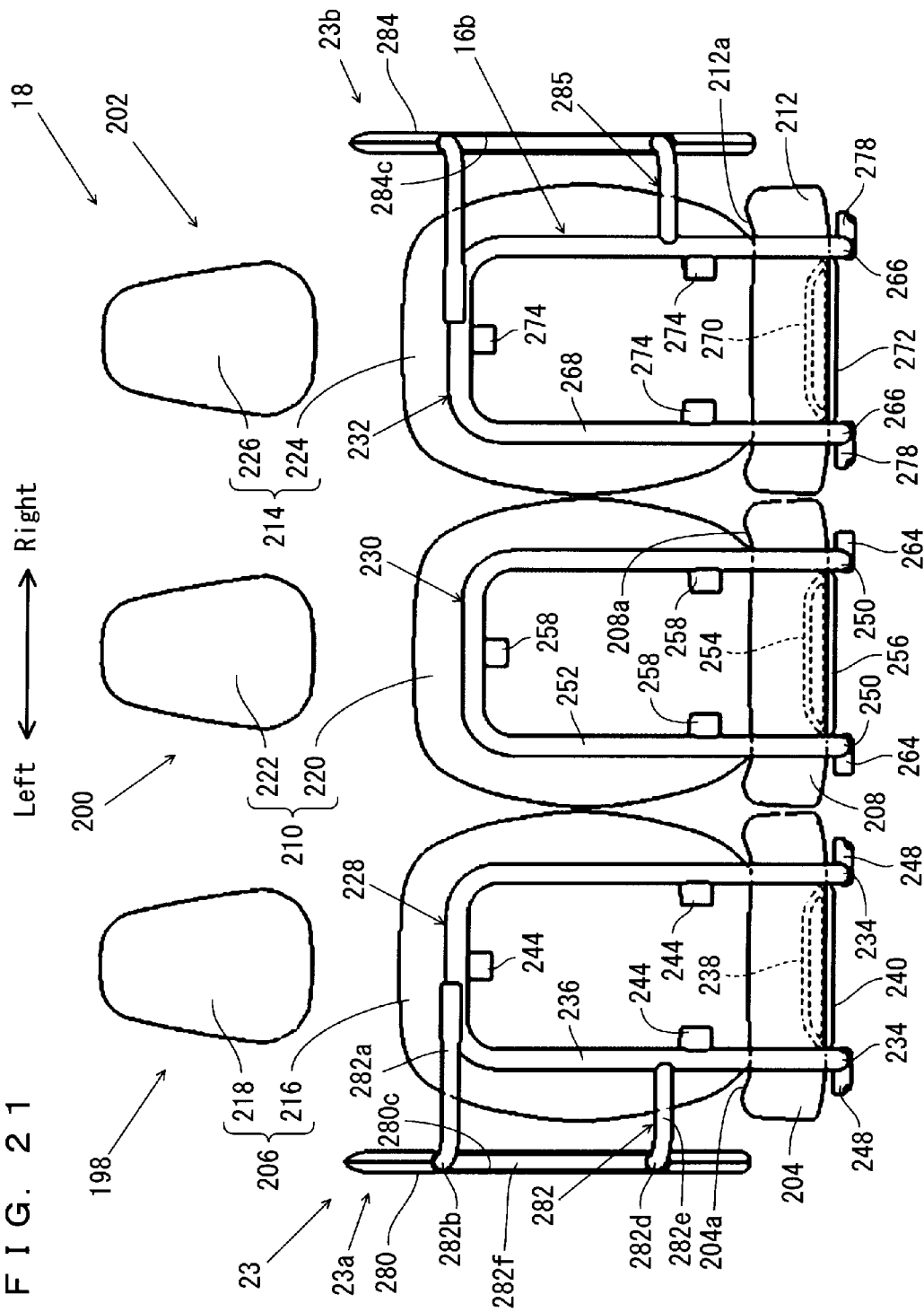
FIG. 21 is a rear view showing the seat frame portion, the seat unit and the shoulder bolster portion.

Referring to FIG. 20 and FIG. 21, the seat portion 198 includes a seat bottom portion 204 which supports a human body from below, and a back support portion 206 which supports the human body from behind. Likewise, the seat portion 200 includes a seat bottom portion 208 and a back support portion 210, whereas the seat portion 202 includes a seat bottom portion 212 and a back support portion 214.

The back support portion 206 includes a seat back portion 216 which supports the back of the human body, and a headrest portion 218 which supports the head of the human body. Likewise, the back support portion 210 includes a seat back portion 220 and a headrest portion 222, whereas the back support portion 214 includes a seat back portion 224 and a headrest portion 226.

In the present preferred embodiment, the seat portion 198 represents the first seat portion, the seat portion 202 represents the second seat portion, the seat frame 228 represents the first seat frame, and the seat frame 232 represents the second seat frame.

The seat bottom portion 204 includes a seat surface 204a which supports the buttocks of the human body, the seat bottom portion 208 includes a seat surface 208a which supports the buttocks of the human body, and the seat bottom portion 212 includes a seat surface 212a which supports the buttocks of the human body. Referring to FIG. 20, the seat back portion 216 includes a backrest surface 216a which supports the back of the human body, the seat back portion 220 includes a backrest surface 220a which supports the back of the human body, and the seat back portion 224 includes a backrest surface 224a which supports the back of the human body. In the present preferred embodiment, each of the seat surfaces 204a, 208a, 212a includes a downward receding recess in its middle region in a left-right direction. Each of the backrest surfaces 216a, 220a, 224a has a backward receding recess in its middle region in a left-right direction. The seat unit 18 is supported by the seat frame portion 16b, with each of the backrest surfaces 216a, 220a, 224a tilted backward.

Referring to FIG. 20 and FIG. 21, the seat frame portion 16b includes a seat frame 228 which supports the seat portion 198, a seat frame 230 which supports the seat portion 200, and a seat frame 232 which supports the seat portion 202. In the present preferred embodiment, the seat frame 228 supports the seat bottom portion 204 and the seat back portion 216 of the seat portion 198, the seat frame 230 supports the seat bottom portion 208 and the seat back portion 220 of the seat portion 200, and the seat frame 232 supports the seat bottom portion 212 and the seat back portion 224 of the seat portion 202.

Referring to FIG. 5, as has been described earlier, the headrest portion 218 of the seat portion 198 is attached to the mounting portion 88b of the cross member portion 86, the headrest portion 222 of the seat portion 200 is attached to the mounting portion 90b of the cross member portion 86, and the headrest portion 226 of the seat portion 202 is attached to the mounting portion 92b of the cross member portion 86. Referring to FIG. 8, as has been described earlier, the mounting portion 90b is located at a more rearward position than the mounting portions 88b, 92b. Therefore, referring to FIG. 20, the headrest portion 222 is located at a more rearward position than the headrest portions 218, 226.

Referring to FIG. 20 and FIG. 21, the seat frame 228 includes a pair of bottom frame portions 234 extending in a fore-aft direction and a back frame portion 236 extending in an up-down direction. In the present preferred embodiment, the pair of bottom frame portions 234 and the back frame portion 236 are integral with each other. The back frame portion 236 is shaped in an inverted letter of U or substantially in an inverted letter of U in a rear view, extending obliquely from rear ends of the pair of bottom frame portions 234 in an upwardly rearward direction. A connecting member 282, which will be described later, of a shoulder bolster portion 23 is fixed to the back frame portion 236.

Figure 22:
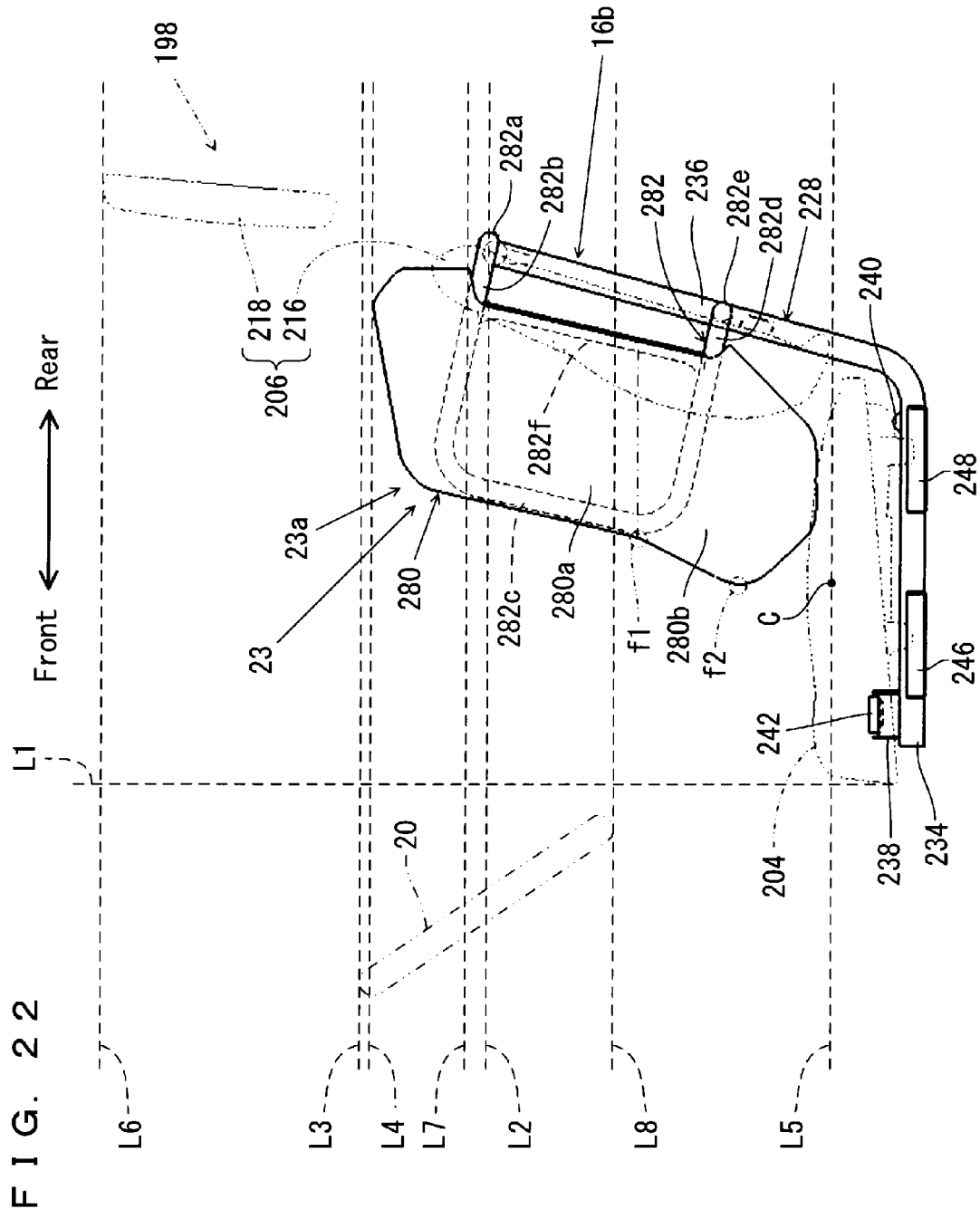
FIG. 22 is a side view (from a left side) showing the seat frame portion and the shoulder bolster portion.

The seat frame 228 further includes a cross member 238 which connects forward end regions of the pair of bottom frame portions 234 to each other, and a cross member 240 which connects rearward end regions of the pair of bottom frame portions 234 to each other. Referring to FIG. 20 and FIG. 22, the seat bottom portion 204 has its forward end region attached to the cross member 238 via a mounting member 242. Referring to FIG. 20 through FIG. 22, the seat bottom portion 204 has its rearward end region supported by the cross member 240. Thus, the seat bottom portion 204 is supported by the pair of bottom frame portions 234 via the cross members 238, 240.

Referring to FIG. 20 and FIG. 21, the seat frame 228 further includes a plurality (for example, three in the present preferred embodiment, although only two are shown in FIG. 20) of brackets 244 fixed to the back frame portion 236. The seat back portion 216 is attached to the plurality of brackets 244. Thus, the seat back portion 216 is supported by the back frame portion 236.

Referring to FIG. 20 through FIG. 22, the seat frame 228 further includes a pair of brackets 246 and a pair of brackets 248. Each of the brackets 246 is fixed to a forward region of the bottom frame portion 234, whereas each of the brackets 248 is fixed to a rearward region of the bottom frame portion 234. Referring to FIG. 20, each bracket 246 includes a plurality (for example, three in the present preferred embodiment) of through-holes 246a penetrating in an up-down direction, whereas each bracket 248 includes a plurality (for example, three in the present preferred embodiment) of through-holes 248a penetrating in an up-down direction.

Referring to FIG. 8, FIG. 18 and FIG. 20, the pair of brackets 246 are fixed to a support frame portion 70a of the frame portion 16, whereas the pair of brackets 248 are fixed to a support frame portion 78a of the frame portion 16. Thus, the seat frame 228 is fixed to the support frame portions 70a, 78a. Specifically, the seat portion 198 (the seat bottom portion 204 and the seat back portion 216 as components of the seat portion 198 in the present preferred embodiment) is supported by the frame portion 16.

The support frame portion 70a includes a pair of through-holes (not illustrated) at positions corresponding to the pair of brackets 246, whereas the support frame portion 78a includes a pair of through-holes (not illustrated) at positions corresponding to the pair of brackets 248. In the present preferred embodiment, the brackets 246 and the support frame portion 70a are connected to each other by, e.g., inserting a fastener (such as a bolt) through one of the through-holes 246a in each bracket 246 and a corresponding one in the support frame portion 70a. Likewise, the brackets 248 and the support frame portion 78a are connected to each other by, e.g., inserting a fastener (such as a bolt) through one of the through-holes 248a in each bracket 248 and a corresponding one in the support frame portion 78a.

In the present preferred embodiment, one through-hole 246a is appropriately selected from the three through-holes 246a in each bracket 246 for connection between the support frame portion 70a and the brackets 246. Likewise, one through-hole 248a is appropriately selected from the three through-holes 248a in each bracket 248 for connection between the support frame portion 78a and the brackets 248. Thus, the seat portion 198 (the seat bottom portion 204 and the seat back portion 216 as components of the seat portion 198 in the present preferred embodiment) is adjustable in its position in a fore-aft direction. In the present preferred embodiment, the headrest portion 218 of the seat portion 198 does not move in a fore-aft direction.

For example, the through-hole 246a at the most forward position in each of the brackets 246 and the through-hole 248a at the most forward position in each of the brackets 248 are used to connect the brackets 246, 248 to the support frame portions 70a, 78a. In this case, the seat portion 198 (the seat bottom portion 204 and the seat back portion 216) is disposed at the most rearward position. Also, for example, the through-hole 246a at the most rearward position in each of the brackets 246 and the through-hole 248a at the most rearward position in each of the brackets 248 are used to connect the brackets 246, 248 to the support frame portions 70a, 78a. In this case, the seat portion 198 (the seat bottom portion 204 and the seat back portion 216) is disposed at the most forward position. In FIG. 6, solid lines show the seat bottom portion 204 and the seat back portion 216 disposed at their most rearward positions, whereas alternate long and short dash lines show the seat bottom portion 204 and the seat back portion 216 at their most forward positions. It should be noted here that the vehicle 10 may be arranged such that the seat portion 198 (seat frame 228) is slidable in a fore-aft direction with respect to the main frame portion 16a.

Referring to FIG. 20 and FIG. 21, the seat frame 230 includes a pair of bottom frame portions 250 extending in a fore-aft direction and a back frame portion 252 extending in an up-down direction. The pair of bottom frame portions 250 preferably have the same shape as the pair of bottom frame portions 234. The back frame portion 252 preferably has the same shape as the back frame portion 236 except that it is slanted more rearward than the back frame portion 236.

The seat frame 230 further includes a cross member 254 which is of the same design as the cross member 238, a cross member 256 which is of the same design as the cross member 240, and a plurality (for example, three in the present preferred embodiment, although only two are shown in FIG. 20) of brackets 258 which are of the same design as the plurality of brackets 244.

Referring to FIG. 20, the seat bottom portion 208 has its forward end region attached to the cross member 254 via a mounting member 260. The seat bottom portion 208 has its rearward end region supported by the cross member 256. Thus, the seat bottom portion 208 is supported by the pair of bottom frame portions 250 via the cross members 254, 256. Referring to FIG. 20 and FIG. 21, the seat back portion 220 is attached to the plurality of brackets 258. Thus, the seat back portion 220 is supported by the back frame portion 252.

Referring to FIG. 20 and FIG. 21, the seat frame 230 further includes a pair of brackets 262 and a pair of brackets 264. Each of the brackets 262 is fixed to a forward region of the bottom frame portion 250, whereas each of the brackets 264 is fixed to a rearward region of the bottom frame portion 250. Referring to FIG. 20, each of the brackets 262 includes a through-hole 262a penetrating in an up-down direction, whereas each of the brackets 264 includes a through-hole 264a penetrating in an up-down direction.

Referring to FIG. 18 and FIG. 20, the bracket 262 on the left side is fixed to a right end region of the support frame portion 70a with unillustrated fasteners (such as bolt and nut) for example, whereas the bracket 262 on the right side is fixed to a left end region of the support frame portion 70b with unillustrated fasteners, for example. Referring to FIG. 8 and FIG. 20, the bracket 264 on the left side is fixed to a right end region of the support frame portion 78a with unillustrated fasteners, for example, whereas the bracket 264 on the right side is fixed to a left end region of the support frame portion 78b with unillustrated fasteners, for example. Thus, the seat frame 230 is fixed to the support frame portions 70a, 70b, 78a, 78b. Specifically, the seat portion 200 (the seat bottom portion 208 and the seat back portion 220 as components of the seat portion 200 in the present preferred embodiment) is supported by the frame portion 16.

As has been described earlier, the back frame portion 252 of the seat frame 230 tilts more rearward than the back frame portion 236 of the seat frame 228. For this reason, the seat back portion 220 which is supported by the back frame portion 252 has a greater rearward tilting angle than the seat back portion 216 which is supported by the back frame portion 236. More specifically, the backrest surface 220a of the seat back portion 220 tilts more rearward than the backrest surface 216a of the seat back portion 216.

Referring to FIG. 20 and FIG. 21, the seat frame 232 preferably has the same arrangement as the seat frame 228, and includes a pair of bottom frame portions 266, a back frame portion 268, cross members 270, 272, a plurality of brackets 274, a pair of brackets 276 and a pair of brackets 278. The seat frame 232 supports the seat bottom portion 212 and the seat back portion 224. Also, Referring to FIG. 8, FIG. 18 and FIG. 20, the brackets 276, 278 of the seat frame 232 are fixed to the support frame portions 70b, 78b. Thus, the seat portion 202 (the seat bottom portion 212 and the seat back portion 224 as components of the seat portion 202 in the present preferred embodiment) is supported by the frame portion 16. Referring to FIG. 20, to the back frame portion 268, a connecting member 285, which will be described later, of the shoulder bolster portion 23 is fixed.

In the present preferred embodiment, the seat frame 232 is supported by the main frame portion 16a in a non-adjustable manner in a fore-aft direction.

Referring to FIG. 20, in the present preferred embodiment, the seat frame portion 16b is preferably constructed such that the back frame portions 236, 252, 268 are not adjustable in their rearward tilting angle. Therefore, the rearward tilting angle of the backrest surface 216a and the rearward tilting angle of the backrest surface 220a cannot be set to the same angle as each other in the vehicle 10. It should be noted here that the seat frame portion 16b may be so made that the back frame portions 236, 252, 268 are adjustable in their rearward tilting angle, for example. Even in this case, it is preferable that the seat frame portion 16b is designed so as not to allow the rearward tilting angle of the backrest surface 216a and the rearward tilting angle of the backrest surface 220a to be set to the same angle as each other.

Referring to FIG. 18 through FIG. 21, the shoulder bolster portion 23 includes a first portion 23a and a second portion 23b. In the width direction of the vehicle 10, at least a portion of the shoulder bolster portion 23 is located outward of the seat unit 18. Referring to FIG. 18, in the present preferred embodiment, in the width direction of the vehicle 10, the entire shoulder bolster portion 23 is located farther inward than any outermost portion of the roll-over protection cage 22. In other words, in a front view, the entire shoulder bolster portion 23 is located farther inward than outer edges of the roll-over protection cage 22.

Referring to FIG. 20 through FIG. 22, the first portion 23a includes a first shoulder bolster member 280 and a connecting member 282. Referring to FIG. 20 and FIG. 21, the second portion 23b includes a second shoulder bolster member 284 and a connecting member 285. Each of the first shoulder bolster member 280 and the second shoulder bolster member 284 includes a platy member, for example. Further, in the present preferred embodiment, each of the first shoulder bolster member 280 and the second shoulder bolster member 284 is provided by an elongated member which is elongated in an up-down direction. Each of the connecting member 282 and the connecting member 285 is provided by a pipe member, for example. In the width direction of the vehicle 10, the first shoulder bolster member 280 and the second shoulder bolster member 284 are on the outer sides of the seat unit 18. In the present preferred embodiment, in the width direction of the vehicle 10, the first shoulder bolster member 280 is on an outer side of the seat portion 198, whereas the second shoulder bolster member 284 is on an outer side of the seat portion 202.

Figure 23:
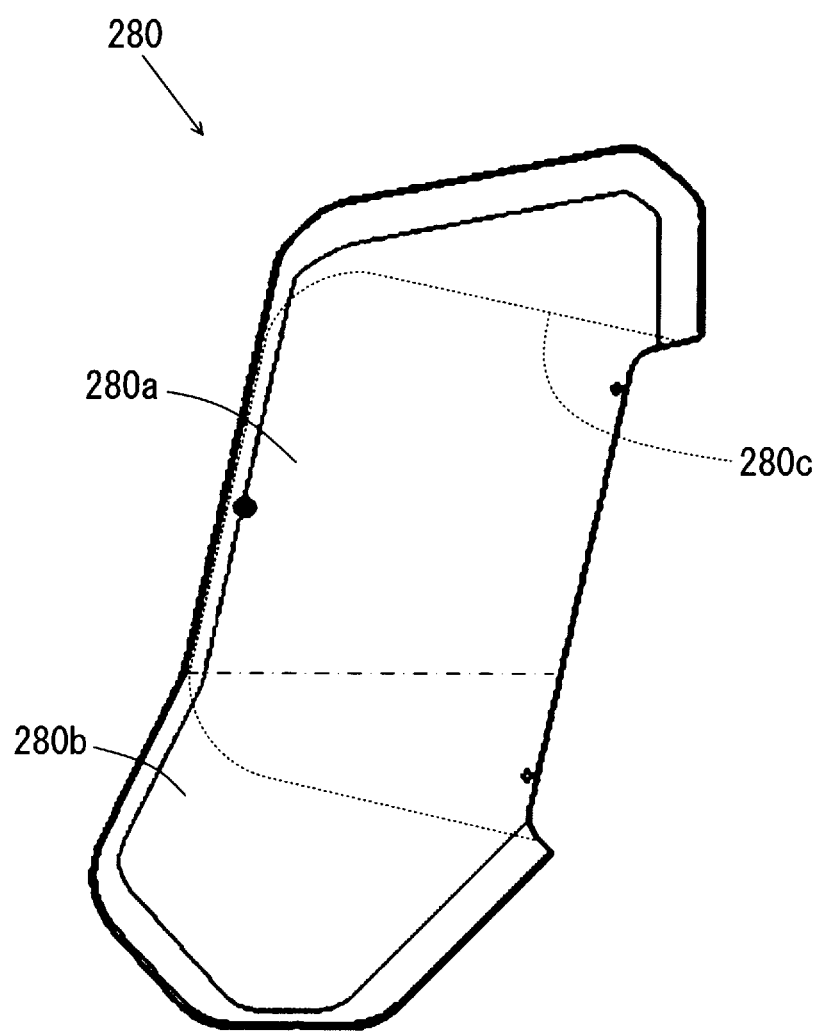
FIG. 23 is a side view of a first shoulder bolster member.

Referring to FIG. 22 and FIG. 23, the first shoulder bolster member 280 includes a main portion 280a and a sub-portion 280b which is at a lower position than the main portion 280a. FIG. 22 and FIG. 23 show a border between the main portion 280a and the sub-portion 280b in an alternate long and short dash line. Referring to FIG. 22, the main portion 280a has its forward end f1 at a more rearward position than a forward end f2 of the sub-portion 280b.

Referring to FIG. 23, the first shoulder bolster member 280 further has a rearward opening hollow portion 280c. The hollow portion 280c is arranged across the main portion 280a and the sub-portion 280b.

Referring to FIG. 21 and FIG. 22, the connecting member 282 includes a first portion 282a, a second portion 282b, a third portion 282c (see FIG. 22), a fourth portion 282d, a fifth portion 282e and a sixth portion 282f. The first portion 282a extends from the back frame portion 236, outward (leftward in the present preferred embodiment) in the width direction of the vehicle 10. The second portion 282b extends from an end (left end in the present preferred embodiment) of the first portion 282a, forward and upward. The third portion 282c extends from a forward end of the second portion 282b forward and downward. The fourth portion 282d extends from a lower end of the third portion 282c rearward and downward. The fifth portion 282e extends from a rear end of the fourth portion 282d, inward (rightward in the present preferred embodiment) in the width direction of the vehicle 10, and is connected to the back frame portion 236. The sixth portion 282f extends from a rear region of the second portion 282b forward and downward, and is connected to a rear region of the fourth portion 282d.

Referring to FIG. 21 and FIG. 22, the connecting member 282 is inserted into the hollow portion 280c (see FIG. 21) of the first shoulder bolster member 280. In the present preferred embodiment, the second portion 282b, the third portion 282c (see FIG. 22), the fourth portion 282d and the sixth portion 282f are inserted into the hollow portion 280c. Thus, the first shoulder bolster member 280 is attached to the connecting member 282. In the present preferred embodiment, the hollow portion 280c defines a mounting portion of the first shoulder bolster member 280.

The first portion 282a and the fifth portion 282e are fixed to the back frame portion 236 by welding, for example. Thus, the first shoulder bolster member 280 is supported by the seat frame 228 (more specifically, the back frame portion 236) at two locations spaced from each other in an up-down direction.

The second portion 23b is left-right symmetrical with the first portion 23a. Therefore, the second portion 23b will be described only briefly.

Figure 24:
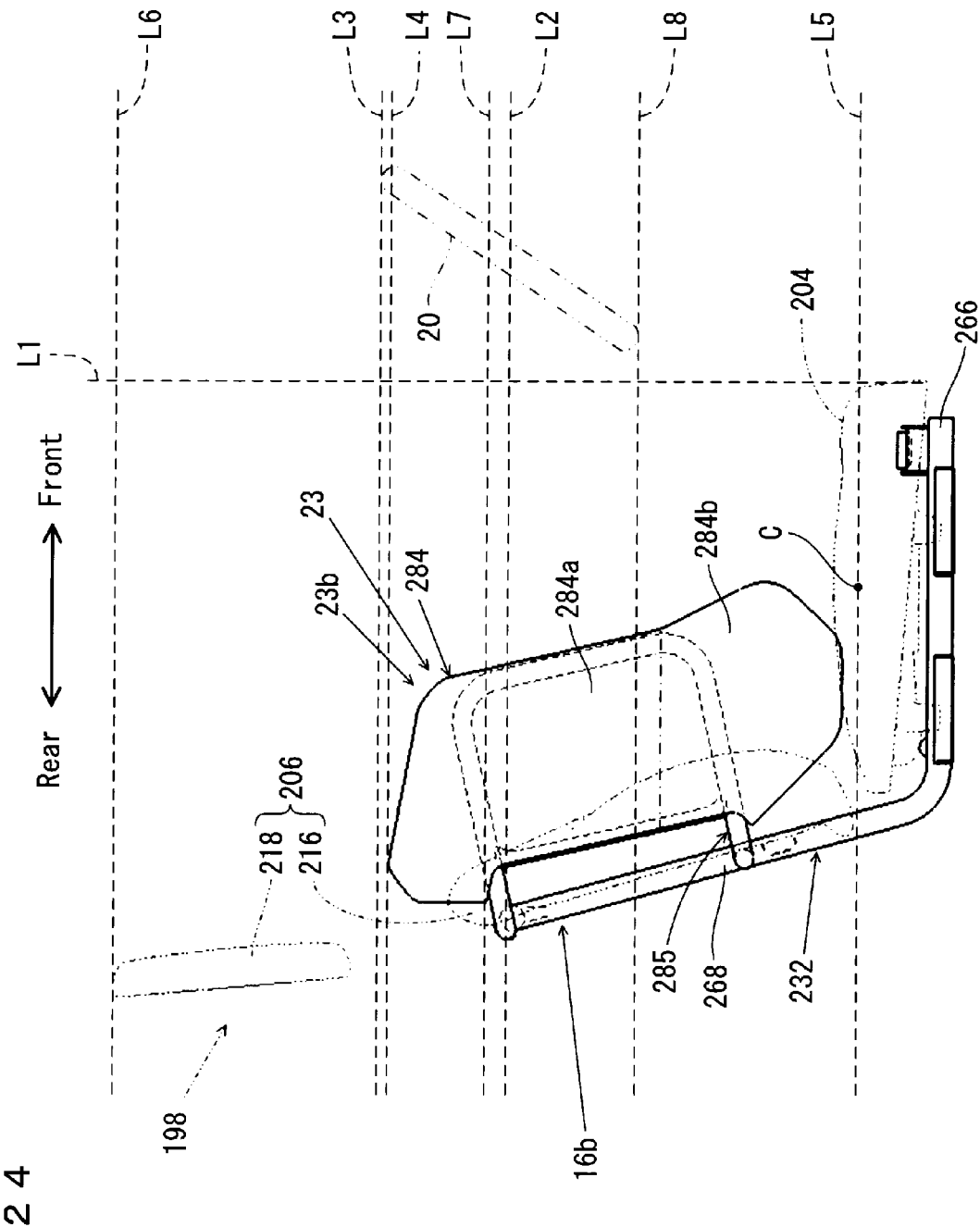
FIG. 24 is a side view (from a right side) showing the seat frame portion and the shoulder bolster portion.

Referring to FIG. 24, the second shoulder bolster member 284 includes a main portion 284a and a sub-portion 284b. The main portion 284a and the sub-portion 284b are preferably arranged in the same relationship as in the main portion 280a and the sub-portion 280b. Referring to FIG. 21, the second shoulder bolster member 284 further includes a hollow portion 284c which is like the hollow portion 280c.

The connecting member 285 is inserted into the hollow portion 284c. Thus, the second shoulder bolster member 284 is attached to the connecting member 282. In the present preferred embodiment, the hollow portion 284c serves as a mounting portion of the second shoulder bolster member 284. The connecting member 285 is fixed to the back frame portion 268 by welding, for example. In the present preferred embodiment, the connecting member 285 is fixed to the back frame portion 268 at two locations spaced from each other in an up-down direction. Thus, the second shoulder bolster member 284 is supported by the seat frame 232 (more specifically, the back frame portion 268) at two locations spaced from each other in an up-down direction.

In the arrangement described above, the shoulder bolster portion 23 is fixed to the seat frame portion 16b.

Referring to FIG. 22 and FIG. 24, in a side view, at least a portion of the shoulder bolster portion 23 is at a more rearward position than a forward end (see broken line L1) of the seat bottom portion 204; at a more forward position than the back support portion 206; at a higher position than a center (see broken line L2) of the steering wheel 20 in an up-down direction; and at a lower position than an upper end (see broken line L3) of the steering wheel 20. The shoulder bolster portion 23 has its upper end (see broken line L4) located at a higher position than a midway position (see broken line L7) between a center C (see broken line L5) of an upper surface (the seat surface 204a (see FIG. 20) in the present preferred embodiment) of the seat bottom portion 204 and an upper end (see broken line L6) of the back support portion 206 in an up-down direction.

It should be noted here that in the present preferred embodiment, the height of the upper end of the first shoulder bolster member 280 and the height of the upper end of the second shoulder bolster member 284 preferably are equal or substantially equal to each other. Also, in the present preferred embodiment, the upper end of the first shoulder bolster member 280 (the second shoulder bolster member 284) is the upper end of the shoulder bolster portion 23.

In a side view, at least a portion of the main portion 280a and at least a portion of the main portion 284a are located at a more rearward position than the forward end (see broken line L1) of the seat bottom portion 204; at a more forward position than the back support portion 206; at a higher position than the center (see broken line L2) of the steering wheel 20 in an up-down direction; and at a lower position than the upper end (see broken line L3) of the steering wheel 20. In a side view, at least a portion of the sub portion 280b and at least a portion of the sub portion 284b are at a more rearward position than the forward end (see broken line L1) of the seat bottom portion 204; at a more forward position than the back support portion 206; at a higher position than the seat bottom portion 204; and at a lower position than a lower end (see broken line L8) of the steering wheel 20.

In a side view, the first shoulder bolster member 280 and the second shoulder bolster member 284 overlap the seat bottom portion 204. Further, in a side view, the first shoulder bolster member 280 and the second shoulder bolster member 284 overlap the back support portion 206. In the present preferred embodiment, in a side view, the first shoulder bolster member 280 and the second shoulder bolster member 284 overlap the seat back portion 216. Referring to FIG. 20, in a plan view, the first shoulder bolster member 280 does not overlap the seat bottom portion 204, nor does the second shoulder bolster member 284 overlap the seat bottom portion 212.

Figure 2:
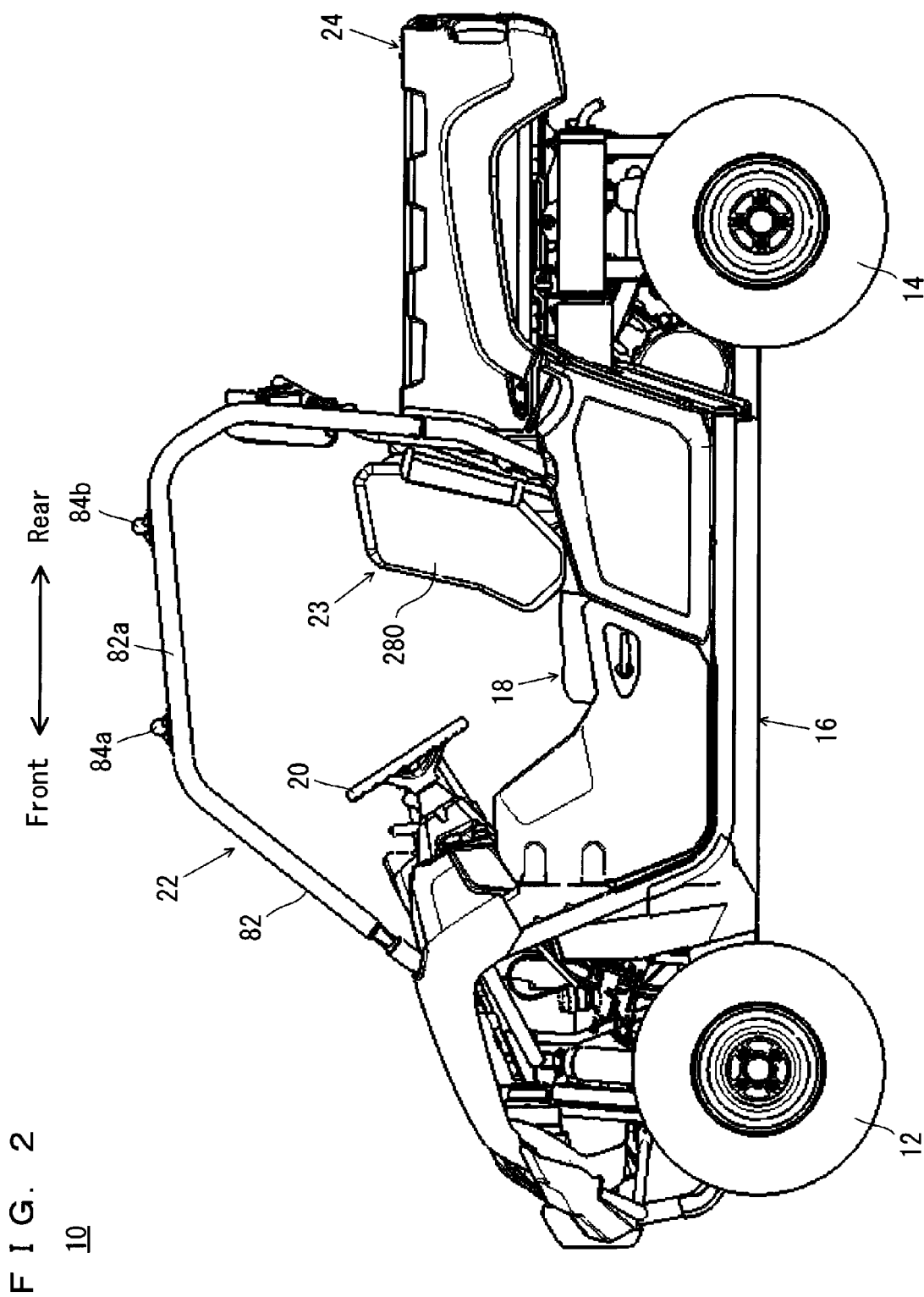
FIG. 2 is a side view of the vehicle.

Referring to FIG. 2, in a side view, the first shoulder bolster member 280 does not overlap the roll-over protection cage 22. In the present preferred embodiment, the first shoulder bolster member 280 and the second shoulder bolster member 284 are at the same position in a side view. Therefore, the second shoulder bolster member 284 does not overlap the roll-over protection cage 22 in a side view, either.

Figure 25:
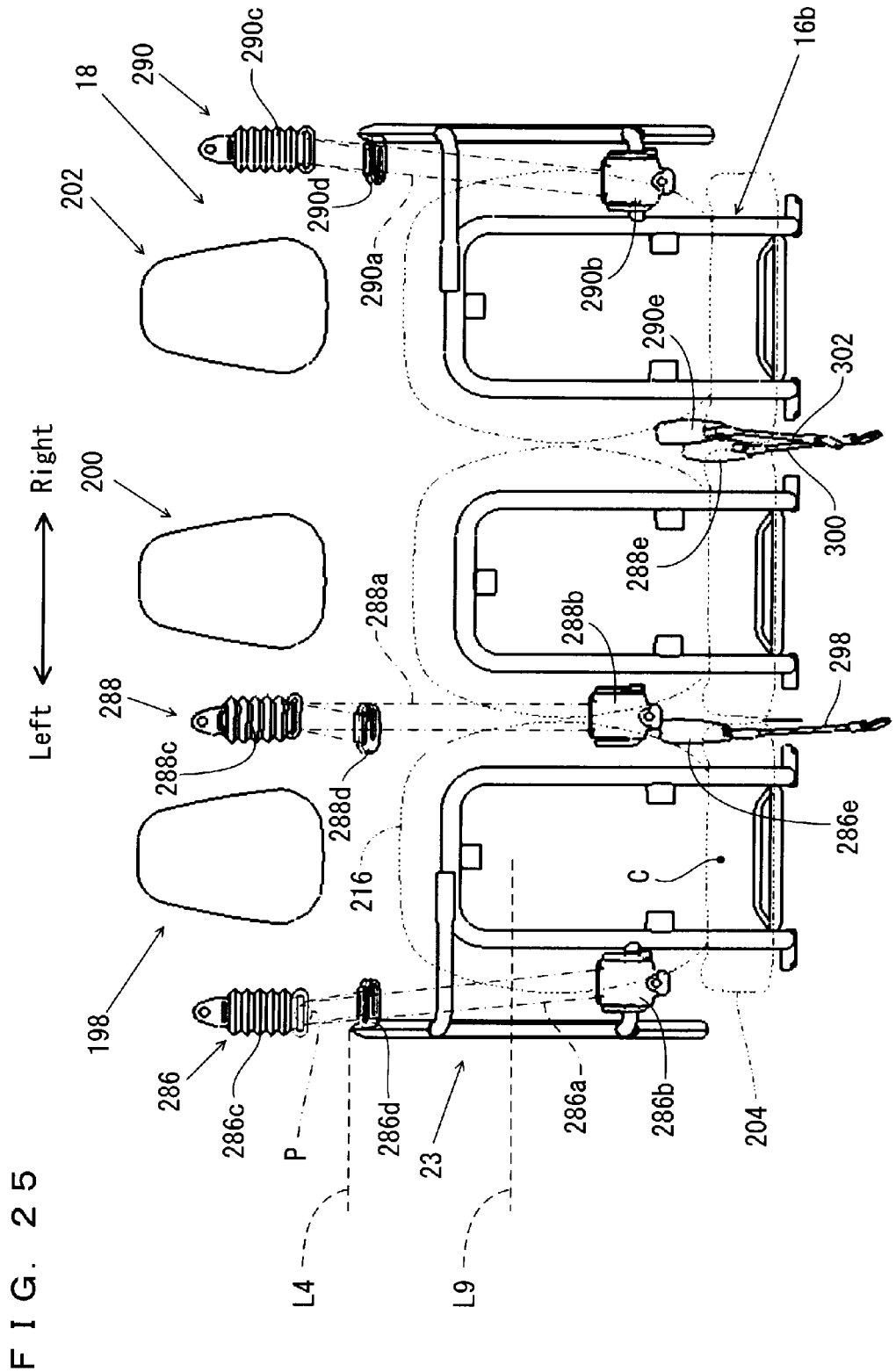
FIG. 25 is a rear view showing the seat frame portion, the seat unit, the shoulder bolster portion, and a plurality of seat belt units.

Referring to FIG. 18 and FIG. 25, the vehicle 10 further includes a plurality (for example, three in the present preferred embodiment) of seat belt units 286, 288, 290. The seat belt unit 286 is for the seat portion 198, the seat belt unit 288 is for the seat portion 200 and the seat belt unit 290 is for the seat portion 202.

Referring to FIG. 25, the seat belt unit 286 includes a belt member 286a; a winding device 286b that winds the belt member 286a; a shoulder anchor 286c which slidably supports the belt member 286a when it is pulled out of the winding device 286b; a tongue member 286d which is attached to the belt member 286a; and a buckle portion 286e which engages with the tongue member 286d and thus fixes the belt member 286a. The shoulder anchor 286c slidably supports the belt member 286a at a support position P which is higher than the seat back portion 216.

The seat belt units 288, 290 preferably have the same configuration with the seat belt unit 286. The seat belt unit 288 includes a belt member 288a, a winding device 288b, a shoulder anchor 288c, a tongue member 288d and a buckle portion 288e. The seat belt unit 290 includes a belt member 290a, a winding device 290b, a shoulder anchor 290c, a tongue member 290d and a buckle portion 290e.

Referring to FIG. 8 and FIG. 25 the winding device 286b is supported by the cross member 52 via a bracket 292, the winding device 288b is supported by the cross member 52 via a bracket 294, and the winding device 290b is supported by the cross member 52 via a bracket 296. The shoulder anchor 286c is supported by the connecting portion 82b via unillustrated fasteners (such as bolts and nuts), the shoulder anchor 288c is supported by the mounting portion 90c via unillustrated fasteners, and the shoulder anchor 290c is supported by the connecting portion 83b via unillustrated fasteners. The buckle portion 286e is supported by the support frame portion 48a via a connecting member 298, the buckle portion 288e is supported by the support frame portion 48b via a connecting member 300, and the buckle portion 290e is supported by the support frame portion 48b via a connecting member 302.

Referring to FIG. 25, the shoulder bolster portion 23 has its upper end (see broken line L4) at a higher position than a midway point (see broken line L9) between the center C of the upper surface of the seat bottom portion 204 and the support position P in an up-down direction.

Hereinafter, functions and advantages of the vehicle 10 will be described.

In the vehicle 10, at least a portion of the shoulder bolster portion 23 is at a more rearward position than the forward end of the seat bottom portion 204; at a more forward position than the back support portion 206; at a higher position than the center of the steering wheel 20 in an up-down direction; and at a lower position than the upper end of the steering wheel 20. Further, the shoulder bolster portion 23 has its upper end at a higher position than the midway position between the center C of the upper surface of the seat bottom portion 204 and the upper end of the back support portion 206 in an up-down direction. The arrangement described above positions the shoulder bolster portion 23 (more specifically, the first shoulder bolster member 280 and the second shoulder bolster member 284) at a height which is equal to or substantially equal to the shoulders of the driver or of the passenger (hereinafter called the crew). Thus, when the crew is swayed left or right, the shoulders of the crew can make contact with the shoulder bolster portion 23 (more specifically, the first shoulder bolster member 280 or the second shoulder bolster member 284). In other words, even when the crew is swayed left or right, the arrangement reduces chances for the crew's abdominal regions to make contact with the shoulder bolster portion 23. As a result, the arrangement prevents swaying of the crew while providing the crew with a comfortable ride.

The shoulder bolster portion 23 includes the first shoulder bolster member 280 and the second shoulder bolster member 284, and each of the first shoulder bolster member 280 and the second shoulder bolster member 284 is provided by a platy member. In this case, the arrangement provides a sufficient area of contact between the shoulders of the crew and the shoulder bolster portion 23 (the first shoulder bolster member 280 or the second shoulder bolster member 284) when the shoulders of the crew make contact with the shoulder bolster portion 23. This provides the crew with a more comfortable ride.

In a side view, the first shoulder bolster member 280 and the second shoulder bolster member 284 overlap the seat back portion 216. In this case, the arrangement provides a larger area of contact between the shoulders of the crew and the shoulder bolster portion 23 (the first shoulder bolster member 280 or the second shoulder bolster member 284). This provides the crew with a more comfortable ride.

In a side view, the first shoulder bolster member 280 and the second shoulder bolster member 284 overlap the seat bottom portion 204. In this case, the arrangement provides a larger area of contact between the crew and the shoulder bolster portion 23 (the first shoulder bolster member 280 or the second shoulder bolster member 284). This provides the crew with a more comfortable ride.

In a side view, neither the first shoulder bolster member 280 nor the second shoulder bolster member 284 overlaps the roll-over protection cage 22. In this case, the arrangement makes it possible to dispose the first shoulder bolster member 280 and the second shoulder bolster member 284 at outermost positions as much as possible without increasing an overall width of the vehicle 10. This provides the crew with a more comfortable ride.

In a plan view, the first shoulder bolster member 280 does not overlap the seat bottom portion 204, nor does the second shoulder bolster member 284 overlap the seat bottom portion 212. In this case, the arrangement allows for sufficient space for the crew to sit on each of the seat bottom portion 204 and the seat bottom portion 208. This provides the crew with a more comfortable ride.

Each of the first shoulder bolster member 280 and the second shoulder bolster member 284 is provided by an elongated member which is elongated in an up-down direction. In this case, the arrangement provides a sufficient area of contact between the shoulders of the crew and the shoulder bolster portion 23 (the first shoulder bolster member 280 or the second shoulder bolster member 284) when the shoulders of the crew make contact with the shoulder bolster portion 23. This provides the crew with a more comfortable ride. Also, the shoulders of the crew are likely to make contact with the shoulder bolster portion 23 regardless of the crew's body sizes (height for example). Therefore, the arrangement provides the crew with a comfortable ride regardless of their body sizes.

In a side view, at least a portion of the main portion 280a and at least a portion of the main portion 284a are at a more rearward position than the forward end of the seat bottom portion 204; at a more forward position than the back support portion 206; at a higher position than the center of the steering wheel 20 in an up-down direction; and at a lower position than the upper end of the steering wheel 20. Further, in a side view, at least a portion of the sub portion 280b and at least a portion of the sub portion 284b are at a more rearward position than the forward end of the seat bottom portion 204; at a more forward position than the back support portion 206; at a higher position than the seat bottom portion 204; and at a lower position than the lower end of the steering wheel 20. According to the arrangement described above, when the crew is swayed in left or right directions, the shoulders of the crew make contact with the main portion 280a (or the main portion 284a), whereas the thighs of the crew make contact with the sub-portion 280b (or the sub-portion 284b). This sufficiently prevents the crew from being swayed. The forward ends of the main portions 280a, 284a are at a more rearward position than the forward ends of the sub-portions 280b, 284b. The arrangement makes it possible to provide sufficient space in front of the main portions 280a, 284a, thus allowing the crew to easily pass through the space when they get on/off the vehicle 10. As a result, the arrangement also improves ease of getting on/off the vehicle of the crew while providing the crew with riding comfort.

The shoulder bolster portion 23 is supported by the seat frame portion 16b. In this case, the arrangement provides a simple configuration of the shoulder bolster portion 23 near the seat unit 18.

The first portion 23a is fixed to the back frame portion 236, whereas the second portion 23b is fixed to the back frame portion 268. In this case, the arrangement provides a simple configuration of the first shoulder bolster member 280 and the second shoulder bolster member 284 along the back support portions 206, 214.

The first portion 23a is fixed to the back frame portion 236 at least at two positions which are spaced from each other in an up-down direction, whereas the second portion 23b is fixed to the back frame portion 268 at least at two positions spaced from each other in an up-down direction. In this case, the arrangement provides a simple configuration that supports the shoulder bolster portion 23 strongly.

In the width direction of the vehicle 10, the entire shoulder bolster portion 23 is located farther inward than the outermost portion of the roll-over protection cage 22. In this case, the arrangement enables to dispose the shoulder bolster portion 23 in the vehicle 10 without increasing the overall width of the vehicle 10.

The seat frame 228, which supports the seat portion 198, is supported by the main frame portion 16a adjustably in a fore-aft direction, whereas the first shoulder bolster member 280 is fixed to the seat frame 228 via the connecting member 282. In this case, the first shoulder bolster member 280 moves in the fore-aft direction with the seat portion 198 when position adjustment is made to the seat portion 198 (the seat bottom portion 204 and the seat back portion 216 of the seat portion 198, in the present preferred embodiment) in a fore-aft direction. Thus, the arrangement reduces sway of the driver, with the first shoulder bolster member 280 regardless of the position of the seat portion 198.

The second shoulder bolster member 284 is fixed to the seat frame 232, which supports the seat portion 202, via the connecting member 285. In this case, the arrangement provides a simple configuration of the second shoulder bolster member 284 near the seat portion 202.

The shoulder bolster portion 23 has its upper end at a higher position than the midway position between the center C of the upper surface of the seat bottom portion 204 and the upper end of the headrest portion 218 in an up-down direction. In this case, the arrangement makes it possible to position the upper end of the shoulder bolster portion 23 at a sufficient height. Thus, the shoulders of the crew are more likely to make contact with the shoulder bolster portion 23 even if the crew's sitting heights are high.

The shoulder bolster portion 23 includes the first shoulder bolster member 280 which is on an outer side of the seat portion 198 and the second shoulder bolster member 284 which is on an outer side of the seat portion 202 in the width direction of the vehicle 10. In this case, it is possible with the first shoulder bolster member 280 to reduce sway of the driver sitting on the seat portion 198, and to reduce sway of the passenger sitting on the seat portion 202 with the second shoulder bolster member 284. This provides a more comfortable ride for the crew (the driver and the passenger).

The shoulder bolster portion 23 has its upper end at a higher position than the midway point in an up-down direction between the center C of the upper surface of the seat bottom portion 204 and the support position P where the belt member 286a is supported by the shoulder anchor 286c. The arrangement makes it possible to dispose the shoulder bolster portion 23 at a height equal to or substantially equal to the height of the crew's shoulders. In this arrangement, the shoulders of the crew can make contact with the shoulder bolster portion 23 when the crew is swayed in left or right directions. In other words, even when the crew is swayed in left or right directions, the arrangement reduces chances for the crew's abdominal regions to make contact with the shoulder bolster portion 23. As a result, the arrangement prevents sway of the crew while providing the crew with a comfortable ride.

In the preferred embodiment described above, description was made for a case where the shoulder bolster portion 23 preferably is fixed to the seat frame portion 16b. However, the shoulder bolster portion 23 may be fixed to the main frame portion 16a.

In the preferred embodiment described above, description was made for a case where the shoulder anchors 286c, 288c, 290c preferably are supported by the roll-over protection cage 22. However, the shoulder anchors 286c, 288c, 290c may be supported by the main frame portion 16a, or by the seat frame portion 16b.

In the preferred embodiment described above, description was made for a case where the shoulder bolster portion 23 preferably includes the first shoulder bolster member 280 and the second shoulder bolster member 284. However, the shoulder bolster portion need not include the first shoulder bolster member 280 or the second shoulder bolster member 284. In this case, the connecting member 282 provides the function of the first shoulder bolster member 280 while the connecting member 285 provides the function of the second shoulder bolster member 284.

In the preferred embodiment described above, description was made for a case where the seat unit 18 preferably includes a plurality of seat portions 198, 200, 202 which are made individually from each other. However, the seat unit may include a plurality of seat portions which are made integrally with each other. Therefore, preferred embodiments of the present invention are also applicable to vehicles which include a bench seat.

In the preferred embodiment described above, description was made for a case where the seat back portion and the headrest portion preferably are made independently from each other. However, the seat back portion and the headrest portion may be made integrally with each other.

In the preferred embodiment described above, description was made for a case where the seat unit 18 preferably includes three seat portions 198, 200, 202, for example. However, the number of the seat portions in the seat unit is not limited to the preferred embodiment described above. For example, the seat unit may only include the first seat portion and the second seat portion, or the seat unit may include four or more seat portions.

In the preferred embodiment described above, description was made for a case where the vehicle 10 preferably includes one seat unit 18. However, the vehicle may include a plurality (two, for example) of seat units arranged in a fore-aft direction.

In the preferred embodiment described above, description was made for a case where the vehicle 10 preferably includes a pair of rear wheels 14. However, the vehicle may include two or more pairs of rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a pair of front wheels;
at least a pair of rear wheels;
a frame portion supported by the pair of front wheels and the pair of rear wheels;
a seat unit including a first seat portion and a second seat portion arranged side by side in a width direction of the vehicle and supported by the frame portion;
a steering wheel in front of the first seat portion;
a roll-over protection cage supported by the frame portion and covering an area above the seat unit and the steering wheel; and
a shoulder bolster portion; wherein
the first seat portion includes a seat bottom portion that supports a human body from below, and a back support portion that supports the human body from behind;
at least one portion of the shoulder bolster portion is located outward of the seat unit in the width direction of the vehicle;
the at least one portion of the shoulder bolster portion, in a side view, is located at a more rearward position than a forwardmost end of the seat bottom portion, at a more forward position than the back support portion, at a higher position than a center of the steering wheel in an up-down direction, and at a lower position than an upper end of the steering wheel;
the shoulder bolster portion has its upper end located at a higher position than a midway point between a center of an upper surface of the seat bottom portion and an upper end of the back support portion in the up-down direction; and
a forwardmost end of the shoulder bolster portion is positioned rearward of the forwardmost end of the seat bottom portion.

2. A vehicle comprising:
a pair of front wheels;
at least a pair of rear wheels;
a frame portion supported by the pair of front wheels and the pair of rear wheels;
a seat unit including a first seat portion and a second seat portion arranged side by side in a width direction of the vehicle and supported by the frame portion;
a steering wheel in front of the first seat portion;
a roll-over protection cage supported by the frame portion and covering an area above the seat unit and the steering wheel; and
a shoulder bolster portion; wherein
the first seat portion includes a seat bottom portion that supports a human body from below, and a back support portion that supports the human body from behind;
at least one portion of the shoulder bolster portion is located outward of the seat unit in the width direction of the vehicle;
the at least one portion of the shoulder bolster portion, in a side view, is located at a more rearward position than a forward end of the seat bottom portion, at a more forward position than the back support portion, at a higher position than a center of the steering wheel in an up-down direction, and at a lower position than an upper end of the steering wheel;
the shoulder bolster portion has its upper end located at a higher position than a midway point between a center of an upper surface of the seat bottom portion and an upper end of the back support portion in the up-down direction; and
the shoulder bolster portion includes a platy member.

3. The vehicle according to claim 2, wherein the platy member overlaps the back support portion in a side view.

4. The vehicle according to claim 2, wherein the platy member overlaps the seat bottom portion in a side view.

5. The vehicle according to claim 2, wherein the platy member does not overlap the roll-over protection cage in a side view.

6. The vehicle according to claim 2, wherein the platy member does not overlap the seat bottom portion in a plan view.

7. The vehicle according to claim 1, wherein the shoulder bolster portion includes an elongated member which is elongated in the up-down direction.

8. A vehicle comprising:
a pair of front wheels;
at least a pair of rear wheels;
a frame portion supported by the pair of front wheels and the pair of rear wheels;
a seat unit including a first seat portion and a second seat portion arranged side by side in a width direction of the vehicle and supported by the frame portion;
a steering wheel in front of the first seat portion;
a roll-over protection cage supported by the frame portion and covering an area above the seat unit and the steering wheel; and
a shoulder bolster portion; wherein
the first seat portion includes a seat bottom portion that supports a human body from below, and a back support portion that supports the human body from behind;
at least one portion of the shoulder bolster portion is located outward of the seat unit in the width direction of the vehicle;
the at least one portion of the shoulder bolster portion, in a side view, is located at a more rearward position than a forward end of the seat bottom portion, at a more forward position than the back support portion, at a higher position than a center of the steering wheel in an up-down direction, and at a lower position than an upper end of the steering wheel;
the shoulder bolster portion has its upper end located at a higher position than a midway point between a center of an upper surface of the seat bottom portion and an upper end of the back support portion in the up-down direction;
the shoulder bolster portion includes an elongated member which is elongated in the up-down direction;
the elongated member includes a main portion and a sub-portion located at a lower position than the main portion;
at least a portion of the main portion is, in a side view, located at a more rearward position than the forward end of the seat bottom portion, at a more forward position than the back support portion, at a higher position than the center of the steering wheel in an up-down direction, and at a lower position than the upper end of the steering wheel;
at least one portion of the sub-portion is, in a side view, located at a more rearward position than the forward end of the seat bottom portion, at a more forward position than the back support portion, at a higher position than the seat bottom portion, and at a lower position than a lower end of the steering wheel; and
the main portion has its forward end located at a more rearward position than a forward end of the sub-portion.

9. The vehicle according to claim 1, wherein the frame portion includes:
a main frame portion supported by the pair of front wheels and the pair of rear wheels; and
a seat frame portion supported by the main frame portion and supporting the seat unit; wherein
the shoulder bolster portion is fixed to the seat frame portion.

10. The vehicle according to claim 9, wherein
the shoulder bolster portion includes an elongated member which is elongated in the up-down direction;
the back support portion includes a seat back portion;
the seat frame portion includes a back frame portion extending in the up-down direction and supporting the seat back portion; and
the shoulder bolster portion is fixed to the back frame portion.

11. The vehicle according to claim 10, wherein the shoulder bolster portion is fixed to the back frame portion at least at two positions spaced from each other in the up-down direction.

12. The vehicle according to claim 1, wherein the shoulder bolster portion is, in its entirety, located farther inward than an outermost portion of the roll-over protection cage in the width direction of the vehicle.

13. The vehicle according to claim 9, wherein
the shoulder bolster portion includes a first shoulder bolster member located on an outer side of the first seat portion in the width direction of the vehicle;
the seat frame portion includes a first seat frame supporting the first seat portion;
the first seat frame is supported by the main frame portion adjustably in a fore-aft direction; and
the first shoulder bolster member is fixed to the first seat frame.

14. The vehicle according to claim 9, wherein
the shoulder bolster portion includes a second shoulder bolster member located on an outer side of the second seat portion in the width direction of the vehicle;
the seat frame portion includes a second seat frame supporting the second seat portion; and
the second shoulder bolster member is fixed to the second seat frame.

15. The vehicle according to claim 1, wherein
the back support portion includes a seat back portion and a headrest portion; and
the back support portion has its upper end defined by an upper end of the headrest portion.

16. The vehicle according to claim 1, wherein the shoulder bolster portion includes a first shoulder bolster member located on an outer side of the first seat portion in the width direction of the vehicle and a second shoulder bolster member located on an outer side of the second seat portion in the width direction.

17. A vehicle comprising:
a pair of front wheels;
at least a pair of rear wheels;
a frame portion supported by the pair of front wheels and the pair of rear wheels;
a seat unit including a first seat portion and a second seat portion arranged side by side in a width direction of the vehicle and supported by the frame portion;
a steering wheel in front of the first seat portion;
a roll-over protection cage supported by the frame portion and covering an area above the seat unit and the steering wheel;
a seat belt unit for the first seat portion; and
a shoulder bolster portion located on an outer side of the seat unit in the width direction of the vehicle; wherein
the first seat portion includes a seat bottom portion and a seat back portion;
the seat belt unit includes a belt member, and a shoulder anchor that slidably supports the belt member at a support position higher than the seat back portion;
at least one portion of the shoulder bolster portion is, in a side view, located at a more rearward position than a forwardmost end of the seat bottom portion, at a more forward position than the seat back portion, at a higher position than a center of the steering wheel in an up-down direction, and at a lower position than an upper end of the steering wheel;

the shoulder bolster portion has its upper end located at a higher position than a midway point between a center of an upper surface of the seat bottom portion and the support position in an up-down direction; and a forwardmost end of the shoulder bolster portion is positioned rearward of the forwardmost end of the seat bottom portion.

18. A shoulder bolster member for a vehicle that includes a seat unit including a seat bottom portion that supports a driver from below and a back support portion that supports the driver from behind, and a roll-over protection cage covering an area above the seat unit, the shoulder bolster member being configured for disposition on an outer side of the seat unit, the shoulder bolster member comprising:

a mounting portion configured to attach the shoulder bolster member to the vehicle, with at least one portion of the shoulder bolster member being, in a side view of the vehicle, located at a more rearward position than a forwardmost end of the seat bottom portion, at a more forward position than the back support portion, at a higher position than a center of the steering wheel in an up-down direction, and at a lower position than an upper end of the steering wheel, with an upper end of the shoulder bolster portion being at a higher position than a midway point between a center of an upper surface of the seat bottom portion and an upper end of the back support portion in an up-down direction; and a forwardmost end of the shoulder bolster portion is positioned rearward of the forwardmost end of the seat bottom portion.

19. A vehicle comprising:

a pair of front wheels;

at least a pair of rear wheels;

a frame portion supported by the pair of front wheels and the pair of rear wheels, the frame portion including a main frame portion and a seat frame portion supported by the main frame portion;

a seat unit including a first seat portion and a second seat portion arranged side by side in a width direction of the vehicle and supported by the seat frame portion;

a steering wheel in front of the first seat portion;

a roll-over protection cage supported by the frame portion and covering an area above the seat unit and the steering wheel; and a shoulder bolster portion; wherein the first seat portion includes a seat bottom portion that supports a human body from below, and a seat back portion that supports the human body from behind;

at least one portion of the shoulder bolster portion is located outward of the seat unit in the width direction of the vehicle;

the seat frame portion includes a back frame portion extending in an up-down direction and supporting the seat back portion; and the shoulder bolster portion is fixed to the back frame portion.

20. The vehicle according to claim 19, wherein the shoulder bolster portion includes a pipe member fixed to the back frame portion at least at two positions spaced from each other in the up-down direction.

21. The vehicle according to claim 19, wherein the seat frame portion is supported by the main frame portion adjustably in a fore-aft direction.

22. The vehicle according to claim 19, wherein the shoulder bolster portion includes a first shoulder bolster member located on an outer side of the first seat portion in the width direction of the vehicle and a second shoulder bolster member located on an outer side of the second seat portion in the width direction.

* * * * *